(12) United States Patent
Han et al.

(10) Patent No.: US 11,277,181 B2
(45) Date of Patent: Mar. 15, 2022

(54) BEAM TRAINING METHOD AND APPARATUS

(71) Applicant: HUAWEI TECHNOLOGIES CO., LTD., Shenzhen (CN)

(72) Inventors: Xiao Han, Shenzhen (CN); Ying Zhang, Chengdu (CN); Zhiwei Chen, Chengdu (CN); Junhao Jiang, Chengdu (CN); Yan Long, Chengdu (CN); Rong He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/313,123

(22) Filed: May 6, 2021

(65) Prior Publication Data

US 2021/0258055 A1 Aug. 19, 2021

Related U.S. Application Data

(63) Continuation of application No. PCT/CN2019/114981, filed on Nov. 1, 2019.

(30) Foreign Application Priority Data

Nov. 6, 2018 (CN) .......................... 201811312045.7

(51) Int. Cl.
*H04B 7/06* (2006.01)

(52) U.S. Cl.
CPC ......... *H04B 7/0617* (2013.01); *H04B 7/0619* (2013.01)

(58) Field of Classification Search
CPC .. H04B 7/0413; H04B 7/0617; H04B 7/0456; H04B 7/0417; H04B 7/0639

(Continued)

(56) References Cited

U.S. PATENT DOCUMENTS

| 2012/0108281 A1* | 5/2012 | Niu ......................... H01Q 3/30 455/507 |
| 2016/0191132 A1 | 6/2016 | Rajagopal et al. |
| 2021/0028831 A1* | 1/2021 | Lou ..................... H04B 7/0417 |

FOREIGN PATENT DOCUMENTS

| CN | 108024376 A | 5/2018 |
| CN | 108242948 A | 7/2018 |

OTHER PUBLICATIONS

RP-180892, Huawei et al., Motivation for NR Multi-TRP and MIMO enhancements, 3GPP TSG RAN Meeting #80, La Jolla, USA, Jun. 11, 2018, total 5 pages.

(Continued)

*Primary Examiner* — Shuwang Liu
*Assistant Examiner* — Gina M Mckie
(74) *Attorney, Agent, or Firm* — Rimon PC

(57) ABSTRACT

This application provides a beam training method and apparatus. The method includes: generating and sending a set up frame, where the set up frame includes M pieces of time information, each piece of time information corresponds to one receiving device in the M receiving devices, each piece of time information is used to indicate a feedback information sending moment of the corresponding receiving device, each piece of time information is further used to indicate an acknowledgment information receiving moment of the corresponding receiving device; receiving a sector sweep SSW frame, generating feedback information based on the SSW frame; sending the feedback information at a feedback information sending moment indicated by corresponding time information; receiving, at an acknowledgment information receiving moment indicated by the corresponding time information, acknowledgment information. Therefore, a training time can be shortened and signaling overheads can be reduced.

18 Claims, 9 Drawing Sheets

(58) Field of Classification Search
USPC .......................................................... 375/267
See application file for complete search history.

(56) References Cited

OTHER PUBLICATIONS

IEEE P802.11ay TM/D2.0, Jul. 1, 2018, Draft Standard for Information Technology-10 Telecommunications and Information Exchange 11 Between Systems-Local and Metropolitan Area 12 Networks-Specific Requirements-Part 11: Wireless 13 LAN Medium Access Control (MAC) and Physical Layer 14 (PHY) Specifications-15, Amendment 7: Enhanced throughput for operation in 16 license-exempt bands above 45 GHz, 673 pages.

IEEE Std 802.11ad TM-2012, IEEE Standard for Information technology—Telecommunications and information exchange between systems Local and metropolitan area networks-Specific requirements, Part 11: Wireless LAN Medium Access Control (MAC) and Physical Layer (PHY) Specifications, Amendment 3: Enhancements for Very High Throughput in the 60 GHz Band, Approved Oct. 19, 2012, total 628 pages.

Zhang Ying et al., STA and Multi-AP Training in Distributed Networks, Jun. 1, 2018, total 32 pages.

\* cited by examiner

BEAM TRAINING METHOD AND APPARATUS

CROSS-REFERENCE TO RELATED APPLICATIONS

This application is a continuation of International Application No. PCT/CN2019/114981, filed on Nov. 1, 2019, which claims priority to Chinese Patent Application No. 201811312045.7, filed on Nov. 6, 2018. The disclosures of the aforementioned applications are hereby incorporated by reference in their entireties.

TECHNICAL FIELD

This application relates to the communications field, and more specifically, to a beam training method and apparatus.

BACKGROUND

Currently, a millimeter-wave band may be used in wireless local area network communication. Available bandwidth of the millimeter-wave band is very wide, and can bring a very high communication rate.

However, channel attenuation of a millimeter-wave signal is severe, and a path loss is large. Therefore, in millimeter-wave communication, a directional beamforming (BF) technology needs to be used to provide an additional transmit/receive antenna gain, to overcome signal attenuation. Because a directional beam is used, a data transmitter/receiver needs to concentrate a transmit direction/receive direction of the data transmitter/receiver within a relatively small angle range.

To implement data receiving and sending, a transmit beam direction of the data transmitter needs to cover a receive beam direction of the data receiver; that is, a transmit beam and a receive beam should be aligned. A process of beam alignment between an access point (AP) and a station (STA) may be referred to as beam training, or beamforming training.

It is assumed that the STA uses J beams, and the AP uses I beams, where J and I are integers greater than or equal to 1. In existing beam training, the AP sends, in a training window, J times of training information through a beam i (in other words, a sector i) of the I beams.

The STA sequentially receives the training information through the J beams (in other words, sectors), determines an optimal beam (in other words, an optimal sector) among the J beams, and sends information about the optimal beam for the beam i to the AP.

In a next training window, the AP switches to another beam (in other words, sector), and the foregoing steps are repeated until all the beams complete training.

It can be learned from the foregoing beam training process that the existing beam training is one-to-one training.

In a distributed network, there may be a plurality of APs in a wireless local area network. If the foregoing training process is still used, the STA needs to separately perform training with each AP in sequence. This consumes a large amount of time and signaling.

Therefore, solutions are needed to provide a technology to shorten a training time and reduce signaling overheads.

SUMMARY

This application provides a beam training method and apparatus, to shorten a training time and reduce signaling overheads.

According to a first aspect, a beam training method is provided. The method includes: A first receiving device in M receiving devices generates and sends a set up frame, where the set up frame includes M pieces of time information, each piece of time information corresponds to one receiving device in the M receiving devices, each piece of time information is used to indicate a feedback information sending moment of the corresponding receiving device, each piece of time information is further used to indicate an acknowledgment information receiving moment of the corresponding receiving device, and M is an integer greater than or equal to 1. The first receiving device receives a sector sweep SSW frame sent by a sending device. The first receiving device generates feedback information based on the SSW frame. The first receiving device sends the feedback information at a feedback information sending moment indicated by corresponding time information. The first receiving device receives, at an acknowledgment information receiving moment indicated by the corresponding time information, acknowledgment information sent by the sending device for the feedback information.

The "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

According to the method provided in this application, the receiving devices determine, through negotiation, sending moments of the feedback information and the acknowledgment information in a beam training process, and the sending moments are notified to the sending device, so that beam training between a same sending device and a plurality of receiving devices can be performed in parallel. In this way, a training time can be shortened, and signaling overheads can be reduced.

Optionally, the set up frame further includes indication information of a plurality of SSW frame sending moments.

Optionally, a quantity of the SSW frame sending moments is determined based on a maximum quantity of beams used by the plurality of receiving devices.

The "maximum quantity of beams" may be understood as a quantity of beams used by a receiving device that uses a maximum quantity of beams.

For example, the quantity of the SSW frame sending moments may be greater than or equal to the maximum quantity of beams.

Optionally, the indication information of the SSW frame sending moments may include indication information of the $1^{st}$ SSW frame sending moment, indication information of a quantity of SSW frames included in each slot, and indication information of the quantity of the SSW frame sending moments.

Optionally, the indication information of the quantity of the SSW frame sending moments may be carried in a reserved field in the set up frame.

Optionally, the set up frame includes a plurality of device information fields, each device information field carries one piece of time information, and each device information field includes a device identifier of a receiving device corresponding to the carried time information.

Optionally, the set up frame includes a scan mode field, information carried in the scan mode field is used to indicate a mode to be used of adopted in a plurality of SSW frame sending modes, the plurality of SSW frame sending modes include a first mode and a second mode, the SSW frame is sent by the sending device in the first mode, and the SSW frame is sent by the receiving device in the second mode.

Optionally, the set up frame includes a feedback mode field, information carried in the feedback mode field is used to indicate a used mode in a plurality of feedback information sending modes, the plurality of feedback information sending modes include a third mode and a fourth mode, feedback information generated by all the receiving devices is sent by a same receiving device in the third mode, and feedback information generated by each receiving device is separately sent by the receiving device in the fourth mode.

Optionally, that the first receiving device sends the feedback information at a feedback information sending moment indicated by corresponding time information includes: The first receiving device sends the feedback information to the sending device at the feedback information sending moment indicated by the corresponding time information.

Optionally, that the first receiving device sends the feedback information at a feedback information sending moment indicated by corresponding time information includes: The first receiving device sends the feedback information to an aggregation receiving device in the M receiving devices at the feedback information sending moment indicated by the corresponding time information, where the aggregation receiving device can send, after aggregation, feedback information of all the receiving devices to the sending device through a feedback frame.

Optionally, the aggregation receiving device may be a receiving device that is in the M receiving devices and whose feedback information sending moment is the latest.

Optionally, the aggregation receiving device may be a serving device of the sending device.

Optionally, the feedback frame includes M feedback information fields, each feedback information field is used to carry one piece of feedback information, and each feedback information field includes a device identifier of a generation device of the carried feedback information.

Optionally, information carried in a feedback information offset field in the SSW frame is set to "0".

Optionally, information carried in an acknowledgment information offset field in the SSW frame is set to "0".

Optionally, each piece of time information is used to indicate a list sending moment of a corresponding receiving device, and the method further includes: The first receiving device generates an information list based on SSW frames sent by the sending device through a plurality of beams, where the information list includes measurement information of each of a plurality of beams. The first receiving device sends the information list at a list sending moment indicated by the corresponding time information.

Optionally, the set up frame includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Optionally, the feedback information is used to indicate a list sending moment of a corresponding receiving device, and the method further includes: The first receiving device generates an information list based on SSW frames sent by the sending device through a plurality of beams, where the information list includes measurement information of each of a plurality of beams. The first receiving device sends the information list at a list sending moment indicated by the corresponding time information.

Optionally, the feedback information includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Optionally, that the first receiving device sends the information list at a list sending moment indicated by the corresponding time information includes: The first receiving device sends the information list to the sending device at the corresponding list sending moment.

Optionally, that the first receiving device sends the information list at a list sending moment indicated by the corresponding time information includes: The first receiving device sends the information list to the aggregation receiving device in the M receiving devices at the corresponding list sending moment, where the aggregation receiving device can send, after aggregation, the information lists of all the receiving devices to the sending device through a management frame.

Optionally, the management frame includes M information list fields, each information list field is used to carry one information list, and each information list field includes a device identifier of a generation device of the carried information list.

According to a second aspect, a beam training method is provided. The method includes: A sending device receives a set up frame, where the set up frame includes M pieces of time information, each piece of time information corresponds to one receiving device in M receiving devices, each piece of time information is used to indicate a feedback information sending moment of the corresponding receiving device, each piece of time information is used to indicate an acknowledgment information receiving moment of the corresponding receiving device, and M is an integer greater than or equal to 1. The sending device sends a sector sweep SSW frame to the receiving device. The sending device receives, at the feedback information sending moment, feedback information generated and sent by each receiving device based on the SSW frame. The sending device sends acknowledgment information for the feedback information to each receiving device at the acknowledgment information receiving moment.

The "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

According to the method provided in this application, the receiving devices determine, through negotiation, sending moments of the feedback information and the acknowledgment information in a beam training process, and the sending moments are notified to the sending device, so that beam training between a same sending device and a plurality of receiving devices can be performed in parallel. In this way, a training time can be shortened, and signaling overheads can be reduced.

Optionally, the set up frame further includes indication information of a plurality of SSW frame sending moments.

Optionally, a quantity of the SSW frame sending moments is determined based on a maximum quantity of beams used by the plurality of receiving devices.

The "maximum quantity of beams" may be understood as a quantity of beams used by a receiving device that uses a maximum quantity of beams.

For example, the quantity of the SSW frame sending moments may be greater than or equal to the maximum quantity of beams.

Optionally, the indication information of the SSW frame sending moments may include indication information of the $1^{st}$ SSW frame sending moment, indication information of a quantity of SSW frames included in each slot, and indication information of the quantity of the SSW frame sending moments.

Optionally, the indication information of the quantity of the SSW frame sending moments may be carried in a reserved field in the set up frame.

Optionally, the set up frame includes a plurality of device information fields, each device information field carries one piece of time information, and each device information field includes a device identifier of a receiving device corresponding to the carried time information.

Optionally, the set up frame includes a scan mode field, information carried in the scan mode field is used to indicate a used mode in a plurality of SSW frame sending modes, the plurality of SSW frame sending modes include a first mode and a second mode, the SSW frame is sent by the sending device in the first mode, and the SSW frame is sent by the receiving device in the second mode.

Optionally, the set up frame includes a feedback mode field, information carried in the feedback mode field is used to indicate a used mode in a plurality of feedback information sending modes, the plurality of feedback information sending modes include a third mode and a fourth mode, feedback information generated by all the receiving devices is sent by a same receiving device in the third mode, and feedback information generated by each receiving device is separately sent by the receiving device in the fourth mode.

Optionally, that the sending device receives, at the feedback information sending moment, feedback information generated and sent by each receiving device based on the SSW frame includes: The sending device receives, at a feedback information sending moment indicated by time information corresponding to each receiving device, the feedback information sent by each receiving device.

Optionally, that the sending device receives, at the feedback information sending moment, feedback information generated and sent by each receiving device based on the SSW frame includes: The sending device receives a feedback frame from an aggregation receiving device at a feedback information sending moment corresponding to the aggregation receiving device, where the feedback frame includes the feedback information of each receiving device.

Optionally, the feedback frame includes M feedback information fields, each feedback information field is used to carry one piece of feedback information, and each feedback information field includes a device identifier of a generation device of the carried feedback information.

Optionally, the aggregation receiving device may be a receiving device that is in the M receiving devices and whose feedback information sending moment is the latest.

Optionally, the aggregation receiving device may be a serving device of the sending device.

Optionally, information carried in a feedback information offset field in the SSW frame is set to "0".

Optionally, information carried in an acknowledgment information offset field in the SSW frame is set to "0".

Optionally, each piece of time information is used to indicate a list sending moment of a corresponding receiving device, and the method further includes: The sending device receives an information list at the list sending moment, where the information list includes measurement information of each of a plurality of beams.

Optionally, the set up frame includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Optionally, the feedback information is used to indicate a list sending moment of a corresponding receiving device, and the method further includes: The sending device receives an information list at the list sending moment, where the information list includes measurement information of each of a plurality of beams.

Optionally, the feedback information includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Optionally, that the sending device receives an information list at the list sending moment includes: The sending device receives an information list from each receiving device at a list sending moment corresponding to the receiving device.

Optionally, that the sending device receives an information list at the list sending moment includes: The sending device receives a management frame from the aggregation receiving device at a list sending moment corresponding to the aggregation receiving device, where the management frame includes the information list of each receiving device.

Optionally, the management frame includes M information list fields, each information list field is used to carry one information list, and each information list field includes a device identifier of a generation device of the carried information list.

According to a third aspect, a beam training method is provided. The method includes: A sending device receives first information, where the first information is used to indicate N first moments in a first training window, N is an integer greater than or equal to 1. The sending device sends beam training information to M receiving devices at each of the N first moments through a first beam, and M is an integer greater than or equal to 2. The sending device receives M pieces of feedback information for the first beam, where the M pieces of feedback information are in a one-to-one correspondence with the M receiving devices, and each piece of feedback information is determined by a corresponding receiving device based on the received beam training information.

The "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

Optionally, the beam training information may include an SSW frame.

In other words, the beam training information may be carried in an SSW frame.

The N first moments are determined by the M receiving devices through negotiation.

Alternatively, the N first moments are determined by a controller of the M receiving devices.

According to the method provided in this application, the receiving devices determine, through negotiation, a sending moment of the training information, and the sending moments are notified to the sending device, so that the receiving devices can simultaneously receive the training information sent by the sending device, and the plurality of receiving devices can complete beam training with the same sending device in a same window. In addition, the plurality of receiving devices complete respective beam training based on the same training information. In this way, a training time can be shortened, and signaling overheads can be reduced.

The "beam" may alternatively be understood as a sector.

In addition, a value of N may be determined based on a quantity of sectors included in each of the M receiving devices.

For example, the value of N is a quantity of sectors included in a specified receiving device in the M receiving devices, and the specified receiving device is a receiving device that is in the M receiving devices and that includes a maximum quantity of sectors.

In addition, in a discovery phase, the receiving device may include, in a discovery frame, indication information used to indicate the quantity of sectors included in the receiving device.

Therefore, in the discovery phase, the sending device may determine, based on the indication information, the quantity of sectors included in each receiving device.

Optionally, that a sending device receives first information includes: The sending device receives the first information from a first device.

The first device may be a controller of the M receiving devices.

Alternatively, the first device may be a receiving device in the M receiving devices.

For example, the receiving device may be a serving device of the sending device.

Alternatively, the receiving device may be a receiving device that is in the M receiving devices and that is first discovered by the sending device.

Optionally, before the sending device receives the first information, the method further includes: The sending device sends request information, where the request information is used to request to allocate a moment at which the sending device sends the training information.

That the sending device sends request information may include: The sending device sends the request information to the serving device of the sending device.

In this case, the method includes: The serving device sends slot indication information to the sending device, where the slot indication information is used to indicate whether a slot that carries the slot indication information is used for uplink transmission or downlink transmission.

In addition, the first moment belongs to a slot used for uplink transmission.

The feedback information is transmitted in a slot used for downlink transmission.

As an example instead of a limitation, the slot indication information is carried in a slot category schedule (slot category schedule) field in a time division duplex slot schedule element (TDD slot schedule element).

Optionally, that the sending device receives M pieces of feedback information for the first beam includes: The sending device receives the M pieces of feedback information from a first device, where the first device includes any one of the following devices: a controller of the M receiving devices, a serving device of the sending device, or a receiving device that is in the M receiving devices and that is first discovered by the sending device.

Therefore, a feedback information delivery process can be completed by a same device, and a plurality of pieces of feedback information can be carried in same signaling, so that the signaling overheads can be further reduced.

Optionally, the method further includes: The sending device receives second information, where the second information is used to indicate M second moments, and each second moment corresponds to one receiving device. That the sending device receives M pieces of feedback information for the first beam includes: The sending device receives, at a target second moment in the M second moments, feedback information for the first beam from a receiving device corresponding to the target second moment, where the target second moment is any one of the M second moments.

A correspondence between the M second moments and the M receiving devices is determined by the M receiving devices through negotiation, or a correspondence between the M second moments and the M receiving devices is determined by the controller of the M receiving devices.

For example, the second information includes indication information of a second moment corresponding to each receiving device.

Alternatively, the second information includes indication information of the $1^{st}$ second moment in the M second moments and indication information of a first time interval, and the first time interval is a time interval between any two adjacent second moments in the M second moments.

Alternatively, the second information includes indication information of the $1^{st}$ second moment in the M second moments and indication information of M-1 second time intervals, the M-1 second time intervals are in a one-to-one correspondence with the M-1 second moments, each second time interval is a time interval between a corresponding second moment and the $1^{st}$ second moment, and the M-1 second moments are moments other than the $1^{st}$ second moment in the M second moments.

Optionally, the method further includes: The sending device receives third information, where the third information is used to indicate a target mode in a plurality of modes, the plurality of modes include a first mode and a second mode, each piece of feedback information for the first beam is sent by a corresponding receiving device in the first mode, and the M pieces of feedback information are carried in a same message in the second mode. That the sending device receives M pieces of feedback information for the first beam includes: The sending device receives the M pieces of feedback information based on the target mode.

Therefore, switching between different modes can be implemented, and communication flexibility is improved.

Optionally, the method further includes: The sending device receives fourth information, where the fourth information is used to indicate M third moments, and each third moment corresponds to one receiving device. The sending device sends target acknowledgment information to a target receiving device at a target third moment in the M third moments, where the target receiving device is a receiving device corresponding to the target third moment, the target acknowledgment information is determined based on feedback information sent by the target receiving device for the first beam, and the target third moment is any one of the M third moments.

A correspondence between the M third moments and the M receiving devices is determined by the M receiving devices through negotiation, or a correspondence between the M third moments and the M receiving devices is determined by the controller of the M receiving devices.

Optionally, at least one piece of feedback information for the first beam includes fifth information, the fifth information is used to indicate K fourth moments in a second training window, K is an integer greater than or equal to 1. The method further includes: The sending device sends beam training information to L receiving devices at each of the K fourth moments through a second beam, and L is an integer greater than or equal to 2. The sending device receives L pieces of feedback information for the second beam, where the L pieces of feedback information are in a one-to-one correspondence with the L receiving devices, and each piece of feedback information is determined by a corresponding receiving device based on the received beam training information.

The K fourth moments are determined by the L receiving devices through negotiation, or the K fourth moments are determined by a controller of the L receiving devices.

Indication information of a sending moment of the training information in the second training window after the first training window is carried in the feedback information, so that the signaling overheads can be further reduced.

Optionally, the method further includes: The sending device receives M measurement information sets, where the M measurement information sets are in a one-to-one correspondence with the M receiving devices, the measurement information set includes measurement information of P beams used by the sending device, the P beams include the first beam, P is an integer greater than or equal to 1, and each measurement information set is determined by a corresponding receiving device based on the received beam training information.

Optionally, that the sending device receives M measurement information sets includes: The sending device receives the M measurement information sets from a second device, where the second device includes any one of the following devices: the controller of the M receiving devices, the serving device of the sending device, or a specified second receiving device in the M receiving devices.

Optionally, the method further includes: The sending device receives fifth information, where the fifth information is used to indicate M fourth moments, and each fourth moment corresponds to one receiving device. That the sending device receives M measurement information sets includes: The sending device receives, at a target fourth moment in the M fourth moments, a measurement information set from a receiving device corresponding to the target fourth moment, where the target fourth moment is any one of the M fourth moments.

A correspondence between the M fourth moments and the M receiving devices is determined by the M receiving devices through negotiation, or a correspondence between the M fourth moments and the M receiving devices is determined by the controller of the M receiving devices.

For example, the fifth information includes indication information of a fourth moment corresponding to each receiving device.

Alternatively, the fifth information includes indication information of the $1^{st}$ fourth moment in the M fourth moments and indication information of a third time interval, and the third time interval is a time interval between any two adjacent fourth moments in the M fourth moments.

Alternatively, the fifth information includes indication information of the $1^{st}$ fourth moment in the M fourth moments and indication information of M-1 fourth time intervals, the M-1 fourth time intervals are in a one-to-one correspondence with the M-1 fourth moments, each fourth time interval is a time interval between a corresponding fourth moment and the $1^{st}$ fourth moment, and the M-1 fourth moments are moments other than the $1^{st}$ fourth moment in the M fourth moments.

Optionally, the fifth information is carried in the feedback information.

Optionally, the method further includes: The sending device receives sixth information, where the sixth information is used to indicate a target mode in a plurality of modes, the plurality of modes include a third mode and a fourth mode, each measurement information set is sent by a corresponding receiving device in the third mode, and the M measurement information sets are carried in a same message in the fourth mode. That the sending device receives M measurement information sets includes: The sending device receives the M measurement information sets based on the target mode.

Optionally, the sixth information is carried in the feedback information.

Therefore, switching between different modes can be implemented, and communication flexibility is improved.

According to a fourth aspect, a beam training method is provided. The method includes: A first receiving device in M receiving devices determines N first moments in a first training window, where N is an integer greater than or equal to 1, and M is an integer greater than or equal to 2, S first moments in the N first moments are in a one-to-one correspondence with S beams used by the first receiving device, and S is an integer greater than or equal to 1 and less than or equal to N. The first receiving device receives, at a target first moment through a beam corresponding to the target first moment, beam training information sent by a sending device through a first beam, where the target first moment is any one of the S first moments. The first receiving device determines feedback information for the first beam based on the beam training information received through the S beams. The first receiving device sends the feedback information for the first beam.

The "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

Optionally, the beam training information may include an SSW frame.

In other words, the beam training information may be carried in an SSW frame.

The N first moments are determined by the M receiving devices through negotiation.

Alternatively, the N first moments are determined by a controller of the M receiving devices.

According to the method provided in this application, the receiving devices determine, through negotiation, a sending moment of the training information, and the sending moments are notified to the sending device, so that the receiving devices can simultaneously receive the training information sent by the sending device, and the plurality of receiving devices can complete beam training with the same sending device in a same window. In addition, the plurality of receiving devices complete respective beam training based on the same training information. In this way, a training time can be shortened, and signaling overheads can be reduced.

The "beam" may alternatively be understood as a sector.

In addition, a value of N may be determined based on a quantity of sectors included in each of the M receiving devices.

For example, the value of N is a quantity of sectors included in a specified receiving device in the M receiving devices, and the specified receiving device is a receiving device that is in the M receiving devices and that includes a maximum quantity of sectors.

In addition, in a discovery phase, the receiving device may include, in a discovery frame, indication information used to indicate the quantity of sectors included in the receiving device.

Therefore, in the discovery phase, the sending device may determine, based on the indication information, the quantity of sectors included in each receiving device.

Optionally, the method further includes: The first receiving device sends first information to the sending device, where the first information is used to indicate the N first moments in the first training window.

The first receiving device may be a controller of the M receiving devices.

Alternatively, the first receiving device may be a specified receiving device in the M receiving devices.

For example, the first receiving device may be a serving device of the sending device.

Alternatively, the first receiving device may be a receiving device that is in the M receiving devices and that is first discovered by the sending device.

Optionally, the method further includes: The first receiving device receives request information sent by the sending device, where the request information is used to request a network side to allocate a moment at which the sending device sends the training information. The first receiving device sends slot indication information to the sending device, where the slot indication information is used to indicate whether a slot that carries the slot indication information is used for uplink transmission or downlink transmission.

In addition, the first moment belongs to a slot used for uplink transmission.

The feedback information is transmitted in a slot used for downlink transmission.

As an example instead of a limitation, the slot indication information is carried in a slot category schedule field in a time division duplex (TDD slot schedule element.

Optionally, that the first receiving device sends the feedback information for the first beam includes: The first receiving device sends the feedback information for the first beam to a first device, where the first device includes any one of the following devices: the controller of the M receiving devices, the serving device of the sending device, or the receiving device that is in the M receiving devices and that is first discovered by the sending device.

Optionally, there is a mapping relationship between the M receiving devices and M second moments, and the mapping relationship is determined by the M receiving devices through negotiation, or the mapping relationship is determined by the controller of the M receiving devices. That the first receiving device sends the feedback information for the first beam includes: The first receiving device sends the feedback information for the first beam to the sending device at a corresponding second moment.

Optionally, the method further includes: The first receiving device sends second information to the sending device, where the second information is used to indicate the mapping relationship between the M second moments and the M receiving devices.

Optionally, the second information includes indication information of a second moment corresponding to each receiving device.

Optionally, the first information includes indication information of the $1^{st}$ second moment in the M second moments and indication information of a first time interval, and the first time interval is a time interval between any two adjacent second moments in the M second moments.

Optionally, the first information includes indication information of the $1^{st}$ second moment in the M second moments and indication information of M-1 second time intervals, the M-1 second time intervals are in a one-to-one correspondence with the M-1 second moments, each second time interval is a time interval between a corresponding second moment and the $1^{st}$ second moment, and the M-1 second moments are moments other than the $1^{st}$ second moment in the M second moments.

Optionally, that the first receiving device sends the feedback information for the first beam includes: The first receiving device determines a target mode in a plurality of modes, where the plurality of modes include a first mode and a second mode, feedback information of each receiving device is separately sent by the receiving device in the first mode, and feedback information of all the receiving devices is sent by a same device in the second mode. The first receiving device sends the feedback information for the first beam based on the target mode.

Optionally, the method further includes: The first receiving device sends third information to the sending device, where the third information is used to indicate the target mode.

Optionally, there is a mapping relationship between the M receiving devices and M third moments, the mapping relationship is determined by the M receiving devices through negotiation, or the mapping relationship is determined by the controller of the M receiving devices, and each third moment is a moment at which a corresponding receiving device receives acknowledgment information for the feedback information. The method further includes: The first receiving device receives acknowledgment information for the feedback information at a corresponding third moment.

Optionally, the method further includes: The first receiving device sends fourth information, where the fourth information is used to indicate the mapping relationship between the M third moments and the M receiving devices.

Optionally, the feedback information for the first beam includes fifth information, the fifth information is used to indicate K fourth moments in a second training window, K is an integer greater than or equal to 1, the K fourth moments are determined by L receiving devices through negotiation, or the K fourth moments are determined by a controller of the L receiving devices, L is an integer greater than or equal to 2, the first receiving device belongs to the L receiving devices, S fourth moments in the K fourth moments are in a one-to-one correspondence with the S beams used by the first receiving device, and S is an integer greater than or equal to 1 and less than or equal to L. The first receiving device receives, at a target fourth moment through a beam corresponding to the target fourth moment, beam training information sent by the station sending device through a second beam, where the target fourth moment is any one of the S fourth moments. The first receiving device determines feedback information for the second beam based on the beam training information received through the S beams. The first receiving device sends the feedback information for the second beam.

Optionally, the method further includes: The first receiving device sends a measurement information set, where the measurement information set includes measurement information of P beams used by the sending device, the P beams include the first beam, and P is an integer greater than or equal to 1.

Optionally, that the first receiving device sends a measurement information set includes: The first receiving device sends the measurement information set to a second device, where the second device includes any one of the following devices: the controller of the M receiving devices, the serving device of the sending device, or a specified second receiving device in the M receiving devices.

Optionally, the method further includes: The first receiving device sends fifth information to the sending device, where the fifth information is used to indicate M fourth moments, and each fourth moment corresponds to one receiving device. That the first receiving device sends a measurement information set includes: The first receiving device sends the measurement information set to the sending device at a corresponding fourth moment.

A correspondence between the M fourth moments and the M receiving devices is determined by the M receiving devices through negotiation, or a correspondence between the M fourth moments and the M receiving devices is determined by the controller of the M receiving devices.

For example, the fifth information includes indication information of a fourth moment corresponding to each receiving device.

Alternatively, the fifth information includes indication information of the $1^{st}$ fourth moment in the M fourth moments and indication information of a third time interval, and the third time interval is a time interval between any two adjacent fourth moments in the M fourth moments.

Alternatively, the fifth information includes indication information of the $1^{st}$ fourth moment in the M fourth moments and indication information of M-1 fourth time intervals, the M-1 fourth time intervals are in a one-to-one correspondence with the M-1 fourth moments, each fourth time interval is a time interval between a corresponding fourth moment and the $1^{st}$ fourth moment, and the M-1 fourth moments are moments other than the $1^{st}$ fourth moment in the M fourth moments.

Optionally, the fifth information is carried in the feedback information.

Optionally, the method further includes: The first receiving device sends sixth information, where the sixth information is used to indicate a target mode in a plurality of modes, the plurality of modes include a third mode and a fourth mode, each measurement information set is sent by a corresponding receiving device in the third mode, and M measurement information sets are carried in a same message in the fourth mode. That the first receiving device sends a measurement information set includes: The first receiving device sends the measurement information set based on the target mode.

Optionally, the sixth information is carried in the feedback information.

Therefore, switching between different modes can be implemented, and communication flexibility is improved.

According to a fifth aspect, a beam training apparatus is provided. The apparatus includes: a processing unit, configured to generate a set up frame, where the set up frame includes M pieces of time information, each piece of time information corresponds to one receiving device in M receiving devices, each piece of time information is used to indicate a feedback information sending moment of the corresponding receiving device, each piece of time information is used to indicate an acknowledgment information receiving moment of the corresponding receiving device, and M is an integer greater than or equal to 1; and a transceiver unit, configured to: send the set up frame, and receive a sector sweep SSW frame sent by a sending device. The processing unit is configured to generate feedback information based on the SSW frame. The transceiver unit is configured to: send the feedback information at a feedback information sending moment indicated by corresponding time information, and receive, at an acknowledgment information receiving moment indicated by the corresponding time information, acknowledgment information sent by the sending device for the feedback information.

The "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

According to the apparatus provided in this application, the receiving devices determine, through negotiation, sending moments of the feedback information and the acknowledgment information in a beam training process, and the sending moments are notified to the sending device, so that beam training between a same sending device and a plurality of receiving devices can be performed in parallel. In this way, a training time can be shortened, and signaling overheads can be reduced.

Optionally, the set up frame further includes indication information of a plurality of SSW frame sending moments.

Optionally, a quantity of the SSW frame sending moments is determined based on a maximum quantity of beams used by the plurality of receiving devices.

The "maximum quantity of beams" may be understood as a quantity of beams used by a receiving device that uses a maximum quantity of beams.

For example, the quantity of the SSW frame sending moments may be greater than or equal to the maximum quantity of beams.

Optionally, the indication information of the SSW frame sending moments may include indication information of the $1^{st}$ SSW frame sending moment, indication information of a quantity of SSW frames included in each slot, and indication information of the quantity of the SSW frame sending moments.

Optionally, the indication information of the quantity of the SSW frame sending moments may be carried in a reserved field in the set up frame.

Optionally, the set up frame includes a plurality of device information fields, each device information field carries one piece of time information, and each device information field includes a device identifier of a receiving device corresponding to the carried time information.

Optionally, the set up frame includes a scan mode field, information carried in the scan mode field is used to indicate a used mode in a plurality of SSW frame sending modes, the plurality of SSW frame sending modes include a first mode and a second mode, the SSW frame is sent by the sending device in the first mode, and the SSW frame is sent by the receiving device in the second mode.

Optionally, the set up frame includes a feedback mode field, information carried in the feedback mode field is used to indicate a used mode in a plurality of feedback information sending modes, the plurality of feedback information sending modes include a third mode and a fourth mode, feedback information generated by all the receiving devices is sent by a same receiving device in the third mode, and feedback information generated by each receiving device is separately sent by the receiving device in the fourth mode.

Optionally, the transceiver unit is configured to send the feedback information to the sending device at the feedback information sending moment indicated by the corresponding time information.

Optionally, the transceiver unit is configured to: receive, at a feedback information sending moment indicated by time information corresponding to each of other receiving devices than the apparatus in the M receiving devices, feedback information sent by each of the other receiving devices; and send, after aggregation, received feedback information of all the receiving devices to the sending device through a feedback frame.

Optionally, the transceiver unit is configured to send the feedback information to an aggregation receiving device in the M receiving devices at the feedback information sending moment indicated by the corresponding time information, where the aggregation receiving device can send, after aggregation, the feedback information of all the receiving devices to the sending device through a feedback frame.

Optionally, the aggregation receiving device may be a receiving device that is in the M receiving devices and whose feedback information sending moment is the latest.

Optionally, the aggregation receiving device may be a serving device of the sending device.

Optionally, the feedback frame includes M feedback information fields, each feedback information field is used to carry one piece of feedback information, and each feedback information field includes a device identifier of a generation device of the carried feedback information.

Optionally, information carried in a feedback information offset field in the SSW frame is set to "0".

Optionally, information carried in an acknowledgment information offset field in the SSW frame is set to "0".

Optionally, each piece of time information is used to indicate a list sending moment of a corresponding receiving device.

Alternatively, the feedback information is used to indicate a list sending moment of a corresponding receiving device.

In addition, the processing unit is configured to generate an information list based on SSW frames sent by the sending device through a plurality of beams, where the information list includes measurement information of each of a plurality of beams. The transceiver unit is configured to send the information list at a list sending moment indicated by the corresponding time information.

Optionally, the set up frame includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Alternatively, the feedback information includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Optionally, the transceiver unit is configured to send the information list to the sending device at the corresponding list sending moment.

Optionally, the transceiver unit is configured to send the information list to an aggregation receiving device in the M receiving devices at the corresponding list sending moment, where the aggregation receiving device can send, after aggregation, the information lists of all the receiving devices to the sending device through a management frame.

Optionally, the management frame includes M information list fields, each information list field is used to carry one information list, and each information list field includes a device identifier of a generation device of the carried information list.

In a design, the beam training apparatus is a communications chip. The communications chip may include an input circuit or interface configured to receive information or data, and an output circuit or interface configured to send information or data.

In another design, the beam training apparatus is a communications device (for example, an AP). The communications device may include a transmitter configured to send information or data, and a receiver configured to receive information or data.

According to a sixth aspect, a beam training apparatus is provided. The apparatus includes: a transceiver unit, configured to receive a set up frame, where the set up frame includes M pieces of time information, each piece of time information corresponds to one receiving device in M receiving devices, each piece of time information is used to indicate a feedback information sending moment of the corresponding receiving device, and each piece of time information is used to indicate an acknowledgment information receiving moment of the corresponding receiving device; and a processing unit, configured to determine the feedback information sending moment and the acknowledgment information receiving moment based on the time information. The transceiver unit is configured to: send a sector sweep SSW frame to the receiving devices; receive, at the feedback information sending moment, feedback information generated and sent by each receiving device based on the SSW frame; and send acknowledgment information for the feedback information to each receiving device at the acknowledgment information receiving moment.

A "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

According to the apparatus provided in this application, the receiving devices determine, through negotiation, sending moments of the feedback information and the acknowledgment information in a beam training process, and the sending moments are notified to the sending device, so that beam training between a same sending device and a plurality of receiving devices can be performed in parallel. In this way, a training time can be shortened, and signaling overheads can be reduced.

Optionally, the set up frame further includes indication information of a plurality of SSW frame sending moments.

Optionally, a quantity of the SSW frame sending moments is determined based on a maximum quantity of beams used by the plurality of receiving devices.

The "maximum quantity of beams" may be understood as a quantity of beams used by a receiving device that uses a maximum quantity of beams.

For example, the quantity of the SSW frame sending moments may be greater than or equal to the maximum quantity of beams.

Optionally, the indication information of the SSW frame sending moments may include indication information of the $1^{st}$ SSW frame sending moment, indication information of a quantity of SSW frames included in each slot, and indication information of the quantity of the SSW frame sending moments.

Optionally, the indication information of the quantity of the SSW frame sending moments may be carried in a reserved field in the set up frame.

Optionally, the set up frame includes a plurality of device information fields, each device information field carries one piece of time information, and each device information field includes a device identifier of a receiving device corresponding to the carried time information.

Optionally, the set up frame includes a scan mode field, information carried in the scan mode field is used to indicate a used mode in a plurality of SSW frame sending modes, the plurality of SSW frame sending modes include a first mode and a second mode, the SSW frame is sent by the sending device in the first mode, and the SSW frame is sent by the receiving device in the second mode.

Optionally, the set up frame includes a feedback mode field, information carried in the feedback mode field is used to indicate a used mode in a plurality of feedback information sending modes, the plurality of feedback information sending modes include a third mode and a fourth mode, feedback information generated by all the receiving devices is sent by a same receiving device in the third mode, and feedback information generated by each receiving device is separately sent by the receiving device in the fourth mode.

Optionally, the transceiver unit is configured to receive a feedback frame from an aggregation receiving device at a feedback information sending moment corresponding to the aggregation receiving device, where the feedback frame includes the feedback information of each receiving device.

Optionally, the feedback frame includes M feedback information fields, each feedback information field is used to carry one piece of feedback information, and each feedback information field includes a device identifier of a generation device of the carried feedback information.

Optionally, information carried in a feedback information offset field in the SSW frame is set to "0".

Optionally, information carried in an acknowledgment information offset field in the SSW frame is set to "0".

Optionally, each piece of time information is used to indicate a list sending moment of a corresponding receiving device.

Alternatively, the feedback information is used to indicate a list sending moment of a corresponding receiving device.

In addition, the transceiver unit is configured to receive an information list at the list sending moment, where the information list includes measurement information of each of a plurality of beams.

Optionally, the set up frame or the feedback information includes a management mode field, information carried in the management mode field is used to indicate a used mode in a plurality of information list sending modes, the plurality of information list sending modes include a fifth mode and a sixth mode, information lists generated by all the receiving devices are sent by a same receiving device in the fifth mode, and an information list generated by each receiving device is separately sent by the receiving device in the sixth mode.

Optionally, the transceiver unit is configured to receive the information list from each receiving device at a list sending moment corresponding to the receiving device.

Optionally, the transceiver unit is configured to receive a management frame from the aggregation receiving device at a list sending moment corresponding to the aggregation receiving device, where the management frame includes the information list of each receiving device.

Optionally, the management frame includes M information list fields, each information list field is used to carry one information list, and each information list field includes a device identifier of a generation device of the carried information list.

In a design, the beam training apparatus is a communications chip. The communications chip may include an input circuit or interface configured to receive information or data, and an output circuit or interface configured to send information or data.

In another design, the beam training apparatus is a communications device (for example, a STA). The communications device may include a transmitter configured to send information or data, and a receiver configured to receive information or data.

According to a seventh aspect, a beam training apparatus is provided. The apparatus includes: a transceiver unit, configured to receive first information, where the first information is used to indicate N first moments in a first training window, N is an integer greater than or equal to 1, and a processing unit, configured to determine the N first moments based on the first information. The transceiver unit is configured to: send beam training information to M receiving devices at each of the N first moments through a first beam, and receive M pieces of feedback information for the first beam, where the M pieces of feedback information are in a one-to-one correspondence with the M receiving devices, and each piece of feedback information is determined by a corresponding receiving device based on the received beam training information, and M is an integer greater than or equal to 2.

A "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

Optionally, the beam training information may include an SSW frame.

In other words, the beam training information may be carried in an SSW frame.

The N first moments are determined by the M receiving devices through negotiation.

Alternatively, the N first moments are determined by a controller of the M receiving devices.

According to the apparatus provided in this application, the receiving devices determine, through negotiation, a sending moment of the training information, and the sending moments are notified to the sending device, so that the receiving devices can simultaneously receive the training information sent by the sending device, and the plurality of receiving devices can complete beam training with the same sending device in a same window. In addition, the plurality of receiving devices complete respective beam training based on the same training information. In this way, a training time can be shortened, and signaling overheads can be reduced.

The "beam" may alternatively be understood as a sector.

In addition, a value of N may be determined based on a quantity of sectors included in each of the M receiving devices.

For example, the value of N is a quantity of sectors included in a specified receiving device in the M receiving devices, and the specified receiving device is a receiving device that is in the M receiving devices and that includes a maximum quantity of sectors.

In addition, in a discovery phase, the receiving device may include, in a discovery frame, indication information used to indicate the quantity of sectors included in the receiving device.

Therefore, in the discovery phase, the sending device may determine, based on the indication information, the quantity of sectors included in each receiving device.

Optionally, the transceiver unit is configured to receive the first information from a first device.

The first device may be a controller of the M receiving devices.

Alternatively, the first device may be a receiving device in the M receiving devices.

For example, the receiving device may be a serving device of the sending device.

Alternatively, the receiving device may be a receiving device that is in the M receiving devices and that is first discovered by the sending device.

Optionally, the transceiver unit is further configured to send request information, where the request information is used to request to allocate a moment at which the sending device sends the training information.

The transceiver unit may send the request information to the serving device of the sending device.

In this case, the transceiver unit is further configured to receive slot indication information from the serving device, where the slot indication information is used to indicate whether a slot that carries the slot indication information is used for uplink transmission or downlink transmission.

In addition, the first moment belongs to a slot used for uplink transmission.

The feedback information is transmitted in a slot used for downlink transmission.

As an example instead of a limitation, the slot indication information is carried in a slot category schedule (slot category schedule) field in a time division duplex slot schedule element (TDD slot schedule element).

Optionally, the transceiver unit is configured to receive the M pieces of feedback information from a first device, where the first device includes any one of the following devices: a controller of the M receiving devices, a serving device of the sending device, or a receiving device that is in the M receiving devices and that is first discovered by the sending device.

Therefore, a feedback information delivery process can be completed by a same device, and a plurality of pieces of feedback information can be carried in same signaling, so that the signaling overheads can be further reduced.

Optionally, the transceiver unit is configured to: receive second information, where the second information is used to indicate M second moments, and each second moment corresponds to one receiving device; and receive, at a target second moment in the M second moments, feedback information for the first beam from a receiving device corresponding to the target second moment, where the target second moment is any one of the M second moments.

A correspondence between the M second moments and the M receiving devices is determined by the M receiving devices through negotiation, or a correspondence between the M second moments and the M receiving devices is determined by the controller of the M receiving devices.

For example, the second information includes indication information of a second moment corresponding to each receiving device.

Alternatively, the second information includes indication information of the $1^{st}$ second moment in the M second moments and indication information of a first time interval, and the first time interval is a time interval between any two adjacent second moments in the M second moments.

Alternatively, the second information includes indication information of the $1^{st}$ second moment in the M second moments and indication information of M-1 second time intervals, the M-1 second time intervals are in a one-to-one correspondence with the M-1 second moments, each second time interval is a time interval between a corresponding second moment and the $1^{st}$ second moment, and the M-1 second moments are moments other than the $1^{st}$ second moment in the M second moments.

Optionally, the transceiver unit is configured to: receive third information, where the third information is used to indicate a target mode in a first mode and a second mode, each piece of feedback information for the first beam is sent by a corresponding receiving device in the first mode, and the M pieces of feedback information are carried in a same message in the second mode; and receive the M pieces of feedback information based on the target mode.

Therefore, switching between different modes can be implemented, and communication flexibility is improved.

Optionally, the transceiver unit is configured to: receive fourth information, where the fourth information is used to indicate M third moments, and each third moment corresponds to one receiving device; and send target acknowledgment information to a target receiving device at a target third moment in the M third moments, where the target receiving device is a receiving device corresponding to the target third moment, the target acknowledgment information is determined based on feedback information sent by the target receiving device for the first beam, and the target third moment is any one of the M third moments.

A correspondence between the M third moments and the M receiving devices is determined by the M receiving devices through negotiation, or a correspondence between the M third moments and the M receiving devices is determined by the controller of the M receiving devices.

Optionally, at least one piece of feedback information for the first beam includes fifth information, the fifth information is used to indicate K fourth moments in a second training window, K is an integer greater than or equal to 1. The transceiver unit is configured to: send beam training information to L receiving devices at each of the K fourth moments through a second beam, and receive L pieces of feedback information for the second beam, where the L pieces of feedback information are in a one-to-one correspondence with the L receiving devices, and each piece of feedback information is determined by a corresponding receiving device based on the received beam training information, and L is an integer greater than or equal to 2.

The K fourth moments are determined by the L receiving devices through negotiation, or the K fourth moments are determined by a controller of the L receiving devices.

Indication information of a sending moment of the training information in the second training window after the first training window is carried in the feedback information, so that the signaling overheads can be further reduced.

Optionally, the transceiver unit is further configured to receive M measurement information sets, where the M measurement information sets are in a one-to-one correspondence with the M receiving devices, the measurement information set includes measurement information of P beams used by the sending device, the P beams include the first beam, P is an integer greater than or equal to 1, and each measurement information set is determined by a corresponding receiving device based on the received beam training information.

Optionally, the transceiver unit is configured to receive the M measurement information sets from a second device, where the second device includes any one of the following devices: the controller of the M receiving devices, the serving device of the sending device, or a specified second receiving device in the M receiving devices.

Optionally, the transceiver unit is configured to: receive fifth information, where the fifth information is used to indicate M fourth moments, and each fourth moment corresponds to one receiving device; and receive, at a target fourth moment in the M fourth moments, a measurement information set from a receiving device corresponding to the target fourth moment, where the target fourth moment is any one of the M fourth moments.

A correspondence between the M fourth moments and the M receiving devices is determined by the M receiving devices through negotiation, or a correspondence between the M fourth moments and the M receiving devices is determined by the controller of the M receiving devices.

For example, the fifth information includes indication information of a fourth moment corresponding to each receiving device.

Alternatively, the fifth information includes indication information of the $1^{st}$ fourth moment in the M fourth moments and indication information of a third time interval, and the third time interval is a time interval between any two adjacent fourth moments in the M fourth moments.

Alternatively, the fifth information includes indication information of the $1^{st}$ fourth moment in the M fourth moments and indication information of M-1 fourth time intervals, the M-1 fourth time intervals are in a one-to-one correspondence with the M-1 fourth moments, each fourth time interval is a time interval between a corresponding fourth moment and the $1^{st}$ fourth moment, and the M-1 fourth moments are moments other than the $1^{st}$ fourth moment in the M fourth moments.

Optionally, the fifth information is carried in the feedback information.

Optionally, the transceiver unit is configured to: receive sixth information, where the sixth information is used to indicate a target mode in a third mode and a fourth mode, each measurement information set is sent by a corresponding receiving device in the third mode, and the M measurement information sets are carried in a same message in the fourth mode; and receive the M pieces of feedback information based on the target mode.

Optionally, the sixth information is carried in the feedback information.

Therefore, switching between different modes can be implemented, and communication flexibility is improved.

In a design, the beam training apparatus is a communications chip. The communications chip may include an input circuit or interface configured to receive information or data, and an output circuit or interface configured to send information or data.

In another design, the beam training apparatus is a communications device (for example, a STA). The communications device may include a transmitter configured to send information or data, and a receiver configured to receive information or data.

According to an eighth aspect, a beam training apparatus is provided. The apparatus includes: a processing unit, configured to determine N first moments in a first training window, where N is an integer greater than or equal to 1, M is an integer greater than or equal to 2, S first moments in the N first moments are in a one-to-one correspondence with S beams used by the apparatus, and S is an integer greater than or equal to 1 and less than or equal to N; and a transceiver unit, configured to receive, at a target first moment through a beam corresponding to the target first moment, beam training information sent by a station sending device through a first beam, where the target first moment is any one of the S first moments. The processing unit is further configured to determine feedback information for the first beam based on the beam training information received through the S beams. The transceiver unit is further configured to send the feedback information for the first beam.

The "sending device" may be understood as a sending device of beam measurement information.

The "receiving device" may be understood as a receiving device of the beam measurement information.

Optionally, the receiving device includes an access point AP, and the sending device includes a station STA.

Alternatively, the receiving device includes an AP, and the sending device includes an AP.

Alternatively, the receiving device includes a STA, and the sending device includes a STA.

Alternatively, the receiving device includes a STA, and the sending device includes an AP.

Optionally, the beam training information may include an SSW frame.

In other words, the beam training information may be carried in an SSW frame.

The N first moments are determined by M receiving devices through negotiation.

Alternatively, the N first moments are determined by a controller of the M receiving devices.

According to the apparatus provided in this application, the receiving devices determine, through negotiation, a sending moment of the training information, and the sending moments are notified to the sending device, so that the receiving devices can simultaneously receive the training information sent by the sending device, and the plurality of receiving devices can complete beam training with the same sending device in a same window. In addition, the plurality of receiving devices complete respective beam training based on the same training information. In this way, a training time can be shortened, and signaling overheads can be reduced.

The "beam" may alternatively be understood as a sector.

In addition, a value of N may be determined based on a quantity of sectors included in each of the M receiving devices.

For example, the value of N is a quantity of sectors included in a specified receiving device in the M receiving devices, and the specified receiving device is a receiving device that is in the M receiving devices and that includes a maximum quantity of sectors.

In addition, in a discovery phase, the receiving device may include, in a discovery frame, indication information used to indicate the quantity of sectors included in the receiving device.

Therefore, in the discovery phase, the sending device may determine, based on the indication information, the quantity of sectors included in each receiving device.

Optionally, the transceiver unit is configured to send first information to the sending device, where the first information is used to indicate the N first moments in the first training window.

The first receiving device may be a controller of the M receiving devices.

Alternatively, the first receiving device may be a specified receiving device in the M receiving devices.

For example, the first receiving device may be a serving device of the sending device.

Alternatively, the first receiving device may be a receiving device that is in the M receiving devices and that is first discovered by the sending device.

Optionally, the transceiver unit is configured to: receive request information sent by the sending device, where the request information is used to request a network side to allocate a moment at which the sending device sends the training information; and send slot indication information to the sending device, where the slot indication information is used to indicate whether a slot that carries the slot indication information is used for uplink transmission or downlink transmission.

In addition, the first moment belongs to a slot used for uplink transmission.

The feedback information is transmitted in a slot used for downlink transmission.

As an example instead of a limitation, the slot indication information is carried in a slot category schedule field in a time division duplex (TDD slot schedule element.

Optionally, the transceiver unit is configured to send the feedback information for the first beam to a first device, where the first device includes any one of the following devices: the controller of the M receiving devices, the serving device of the sending device, or the receiving device that is in the M receiving devices and that is first discovered by the sending device.

Optionally, there is a mapping relationship between the M receiving devices and M second moments, and the mapping relationship is determined by the M receiving devices through negotiation, or the mapping relationship is determined by the controller of the M receiving devices. The transceiver unit is configured to send the feedback information for the first beam to the sending device at a corresponding second moment.

Optionally, the transceiver unit is configured to send second information to the sending device, where the second information is used to indicate the mapping relationship between the M second moments and the M receiving devices.

Optionally, the second information includes indication information of a second moment corresponding to each receiving device.

Optionally, the first information includes indication information of the $1^{st}$ second moment in the M second moments and indication information of a first time interval, and the first time interval is a time interval between any two adjacent second moments in the M second moments.

Optionally, the first information includes indication information of the $1^{st}$ second moment in the M second moments and indication information of M-1 second time intervals, the M-1 second time intervals are in a one-to-one correspondence with the M-1 second moments, each second time interval is a time interval between a corresponding second moment and the $1^{st}$ second moment, and the M-1 second moments are moments other than the $1^{st}$ second moment in the M second moments.

Optionally, the processing unit is further configured to determine a target mode in a first mode and a second mode, where feedback information of each receiving device is separately sent by the receiving device in the first mode, and feedback information of all the receiving devices is sent by a same device in the second mode. The transceiver unit is configured to send the feedback information for the first beam based on the target mode.

Optionally, the transceiver unit is further configured to send third information to the sending device, where the third information is used to indicate the target mode.

Optionally, there is a mapping relationship between the M receiving devices and M third moments, the mapping relationship is determined by the M receiving devices through negotiation, or the mapping relationship is determined by the controller of the M receiving devices, and each third moment is a moment at which a corresponding receiving device receives acknowledgment information for the feedback information. The transceiver unit is further configured to receive acknowledgment information for the feedback information at a corresponding third moment.

Optionally, the transceiver unit is configured to send fourth information, where the fourth information is used to indicate the mapping relationship between the M third moments and the M receiving devices.

Optionally, the feedback information for the first beam includes fifth information, the fifth information is used to indicate K fourth moments in a second training window, K is an integer greater than or equal to 1, the K fourth moments are determined by L receiving devices through negotiation, or the K fourth moments are determined by a controller of the L receiving devices, L is an integer greater than or equal to 2, the first receiving device belongs to the L receiving devices, S fourth moments in the K fourth moments are in a one-to-one correspondence with the S beams used by the first receiving device, and S is an integer greater than or equal to 1 and less than or equal to L. The transceiver unit is configured to receive, at a target fourth moment through a beam corresponding to the target fourth moment, beam training information sent by the station sending device through a second beam, where the target fourth moment is any one of the S fourth moments. The first receiving device determines feedback information for the second beam based on the beam training information received through the S beams. The first receiving device sends the feedback information for the second beam.

Optionally, the transceiver unit is further configured to send a measurement information set, where the measurement information set includes measurement information of P beams used by the sending device, the P beams include the first beam, and P is an integer greater than or equal to 1.

Optionally, the transceiver unit is configured to send a measurement information set to a second device, where the second device includes any one of the following devices: the controller of the M receiving devices, the serving device of the sending device, or a specified second receiving device in the M receiving devices.

Optionally, the transceiver unit is configured to: send fifth information to the sending device, where the fifth information is used to indicate M fourth moments, and each fourth moment corresponds to one receiving device; and send the measurement information set to the sending device at a corresponding fourth moment.

A correspondence between the M fourth moments and the M receiving devices is determined by the M receiving devices through negotiation, or a correspondence between the M fourth moments and the M receiving devices is determined by the controller of the M receiving devices.

For example, the fifth information includes indication information of a fourth moment corresponding to each receiving device.

Alternatively, the fifth information includes indication information of the $1^{st}$ fourth moment in the M fourth moments and indication information of a third time interval, and the third time interval is a time interval between any two adjacent fourth moments in the M fourth moments.

Alternatively, the fifth information includes indication information of the $1^{st}$ fourth moment in the M fourth moments and indication information of M-1 fourth time intervals, the M-1 fourth time intervals are in a one-to-one correspondence with the M-1 fourth moments, each fourth time interval is a time interval between a corresponding fourth moment and the $1^{st}$ fourth moment, and the M-1 fourth moments are moments other than the $1^{st}$ fourth moment in the M fourth moments.

Optionally, the fifth information is carried in the feedback information.

Optionally, the transceiver unit is configured to: send sixth information, where the sixth information is used to indicate a target mode in a third mode and a fourth mode, each measurement information set is sent by a corresponding receiving device in the third mode, and M measurement information sets are carried in a same message in the fourth mode; and send the measurement information set based on the target mode.

Optionally, the sixth information is carried in the feedback information.

Therefore, switching between different modes can be implemented, and communication flexibility is improved.

In a design, the beam training apparatus is a communications chip. The communications chip may include an input circuit or interface configured to receive information or data, and an output circuit or interface configured to send information or data.

In another design, the beam training apparatus is a communications device (for example, an AP). The communications device may include a transmitter configured to send information or data, and a receiver configured to receive information or data.

According to a ninth aspect, a communications device is provided. The communications device includes a transceiver, a processor, and a memory. The processor is configured to control the transceiver to send and receive a signal. The memory is configured to store a computer program. The processor is configured to invoke the computer program from the memory and run the computer program, to enable the communications device to perform the method according to any one of the first aspect to the eighth aspect and the implementations thereof.

Optionally, there are one or more processors and one or more memories.

Optionally, the memory may be integrated with the processor, or the memory and the processor are separately disposed.

As an example instead of a limitation, the communications device may include an encoding device or a decoding device.

According to a tenth aspect, a processor is provided. The processor includes an input circuit, an output circuit, and a processing circuit. The processing circuit is configured to receive a signal via the input circuit, and transmit a signal via the output circuit, to enable the processor to perform the method according to any one of the first aspect to the eighth aspect and the implementations thereof.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to an eleventh aspect, a processing apparatus is provided. The processing apparatus includes a memory and a processor. The processor is configured to: read instructions stored in the memory, receive a signal via a receiver, and transmit a signal via a transmitter, to perform the method according to any one of the first aspect to the eighth aspect and the implementations thereof.

Optionally, there are one or more processors and one or more memories.

Optionally, the memory may be integrated with the processor, or the memory and the processor are separately disposed.

In an example implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

According to a twelfth aspect, a chip is provided. The chip includes a processor and a memory. The memory is configured to store a computer program. The processor is configured to invoke the computer program from the memory and run the computer program. The computer program is used to implement the method according to any one of the first aspect to the eighth aspect and the implementations thereof.

According to a thirteenth aspect, a computer program product is provided. The computer program product includes a computer program (which may also be referred to as code or an instruction). When the computer program is run, a computer is enabled to perform the method according to any one of the first aspect to the eighth aspect and the implementations thereof.

According to a fourteenth aspect, a computer-readable medium is provided. The computer-readable medium stores a computer program (which may also be referred to as code or an instruction). When the computer program is run on a computer, the computer is enabled to perform the method according to any one of the first aspect to the eighth aspect and the implementations thereof.

According to the solutions provided in this application, APs determine, through negotiation, a sending moment of training information, and the sending moment is notified to a STA, so that the APs can simultaneously receive the training information sent by the STA, and the plurality of APs complete beam training with the same STA in a same window. In addition, the plurality of APs complete respective beam training based on the same training information. In this way, a training time can be shortened, and signaling overheads can be reduced.

DETAILED DESCRIPTIONS

Figure 1:
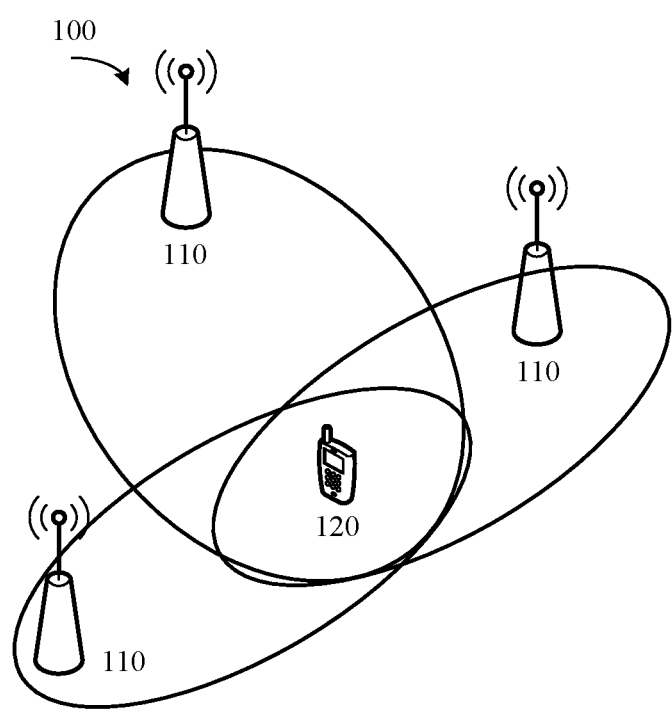
FIG. 1 is a schematic diagram of an example of a communications system according to this application.

The following describes the technical solutions in this application with reference to the accompanying drawings.

The technical solutions in the embodiments of this application may be applied to a wireless local area network (WLAN) system, a wireless fidelity (Wi-Fi) system, or the like.

It should be noted that the wireless local area network system and a mobile communications system may form a heterogeneous network. The mobile communications system may include but is not limited to: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

A STA in the embodiments of this application may include a terminal device that can perform communication based on a wireless local area network technology. The terminal device may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a future 5G network, a terminal device in a future evolved public land mobile network (PLMN), or the like. The STA may alternatively be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

As an example instead of a limitation, in the embodiments of the present disclosure, the STA may alternatively be a wearable device. The wearable device may also be referred to as a wearable intelligent device, and is a general term for wearable devices such as a smart band, smart jewelry, glasses, gloves, watches, clothes, and shoes that are developed by applying wearable technologies in intelligent designs of daily wear. The wearable device is a portable device that can be directly worn on a body or integrated into clothes or an accessory of a user. In addition, the STA in the embodiments of the present disclosure may alternatively be a terminal device in an internet of things (IoT) system. IoT is an important part of future development of information technologies. A main technical feature of the IoT is connecting a thing to a network by using a communications technology, to implement an intelligent network for interconnection between a person and a machine or between one thing and another.

An AP in the embodiments of this application may include a network device that can perform communication based on a wireless local area network technology. The network device may be a device configured to communicate with the terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like, or may be an access point (AP) in a WLAN, or may be a gNB in a new radio (NR) system. This is not limited in the embodiments of this application.

The foregoing listed functions and implementations of the AP and the STA are merely examples for description, and the present disclosure is not limited thereto.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, an example structure of an execution body of a method provided in the embodiments of this application is not specifically limited in the embodiments of this application, provided that a program that records code for the method provided in the embodiments of this application can be run to perform communication according to the method provided in the embodiments of this application. For example, the execution body of the method provided in the embodiments of this application may be a terminal device, a network device, or a function module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

FIG. 1 is a schematic diagram of a system 100 to which a beam training method according to an embodiment of the present disclosure is applicable. As shown in FIG. 1, the system 100 includes a plurality of APs 110 and a plurality of STAs 120.

Each antenna (or an antenna group including a plurality of antennas) and/or area designed for communication are/is referred to as a sector of the AP 110. For example, the antenna group may be designed to communicate with a STA 120 in a sector within coverage of the AP 110. The AP 110 may send a signal to all STAs 120 in the sector corresponding to the AP 110 through a single antenna or a multi-antenna transmit diversity.

To implement data receiving and sending, a transmit beam direction of a data transmitter needs to cover a receive beam direction of a data receiver; that is, a transmit beam and a receive beam can be aligned. A process of beam alignment between the AP and the STA may be referred to as beam training, or beamforming training.

In addition, the communications system 100 may be a PLMN network, a D2D network, an M2M network, an IoT network, or another network. FIG. 1 is merely a simplified schematic diagram used as an example. The network may further include another access network device, which is not shown in FIG. 1.

To resist a path loss in a high-frequency scenario, two communicatively-connected communications devices may obtain a gain through beamforming. The AP 110 and the STA 120 may obtain a pairing relationship between a transmit beam and a receive beam through beam (beam) training.

A beam may be understood as a spatial filter (spatial filter) or a spatial parameter. A beam used for sending a signal may be referred to as a transmit beam (Tx beam), and may be a spatial domain transmit filter or a spatial domain transmit parameter. A beam used for receiving a signal may be referred to as a receive beam (Rx beam), and may be a spatial domain receive filter or a spatial domain receive parameter.

A technology for forming the beam may be a beamforming technology or another technology. For example, the beamforming technology may be specifically a digital beamforming technology, an analog beamforming technology, a hybrid digital/analog beamforming technology, or the like. The transmit beam may refer to distribution of signal strength formed in different directions in space after a signal is transmitted through an antenna, and the receive beam may refer to distribution of signal strength that is of a radio signal received from an antenna and that is in different directions in space.

In an NR protocol, the beam may be, for example, a spatial filter. However, it should be understood that this application does not exclude a possibility that another term is defined in a future protocol to represent a same or similar meaning.

It should be noted that, in the embodiments shown below, the "beam" and the "spatial filter" are interchangeably used. For example, the "transmit beam" and the "spatial domain transmit filter" are interchangeably used, and the "receive beam" and the "spatial domain receive filter" are interchangeably used. Meanings expressed by the terms are consistent when differences between the terms are not emphasized.

A beam pairing relationship is a pairing relationship between a transmit beam and a receive beam, that is, a pairing relationship between a spatial domain transmit filter and a spatial domain receive filter. A relatively large beamforming gain can be obtained by transmitting a signal between a transmit beam and a receive beam that have the beam pairing relationship.

In an implementation, a transmit end may send a sector sweep (SSW) frame in a beam sweep manner, and a receive end may also receive the SSW frame in a beam sweep manner. Specifically, the transmit end may form different directional beams in space through beamforming, and may perform polling on a plurality of different directional beams, to transmit an SSW frame through the different directional beams, so that a power for transmitting the SSW frame can reach a maximum value in a direction directed by a transmit beam. The receive end may also form different directional beams in space through beamforming, and may perform polling on a plurality of different directional beams, to receive an SSW frame through the different directional beams, so that a power for receiving the SSW frame at the receive end can reach a maximum value in a direction directed by a receive beam.

By traversing all transmit beams and receive beams, the receive end may perform channel measurement based on received training information (for example, the SSW frame), and report a measurement result to the transmit end. For example, the receive end may report, to the transmit end, some SSW frame resources with a relatively large reference signal received power (RSRP), and for example, report an identifier of an SSW frame resource, so that the transmit end sends and receives a signal by using a beam pairing relationship with relatively good channel quality during data or signaling transmission.

In a conventional beam training process, the SSW frame (namely, an example of beam training information) is sent by the AP 110 through each sector (or beam), and the STA 120 sequentially receives the SSW frame through each beam used by the STA 120. Therefore, the STA 120 can complete beam training for only one AP 110 in one training process. When the STA 120 needs to perform beam training with a plurality of APs 110, training processes are sequentially performed. Consequently, a large amount of time and a large quantity of signaling resources are consumed.

In comparison, in a beam training process provided in this application, training processes between the STA 120 and a plurality of APs 110 may be performed in parallel, so that time and signaling resource overheads can be greatly reduced.

It should be understood that the SSW frame is merely an example of the training information, and this is not particularly limited in this application. Other information that can be used for beam training falls within the protection scope of this application. For ease of understanding and description, the following uses the SSW frame as the training information for description.

Figure 2A:
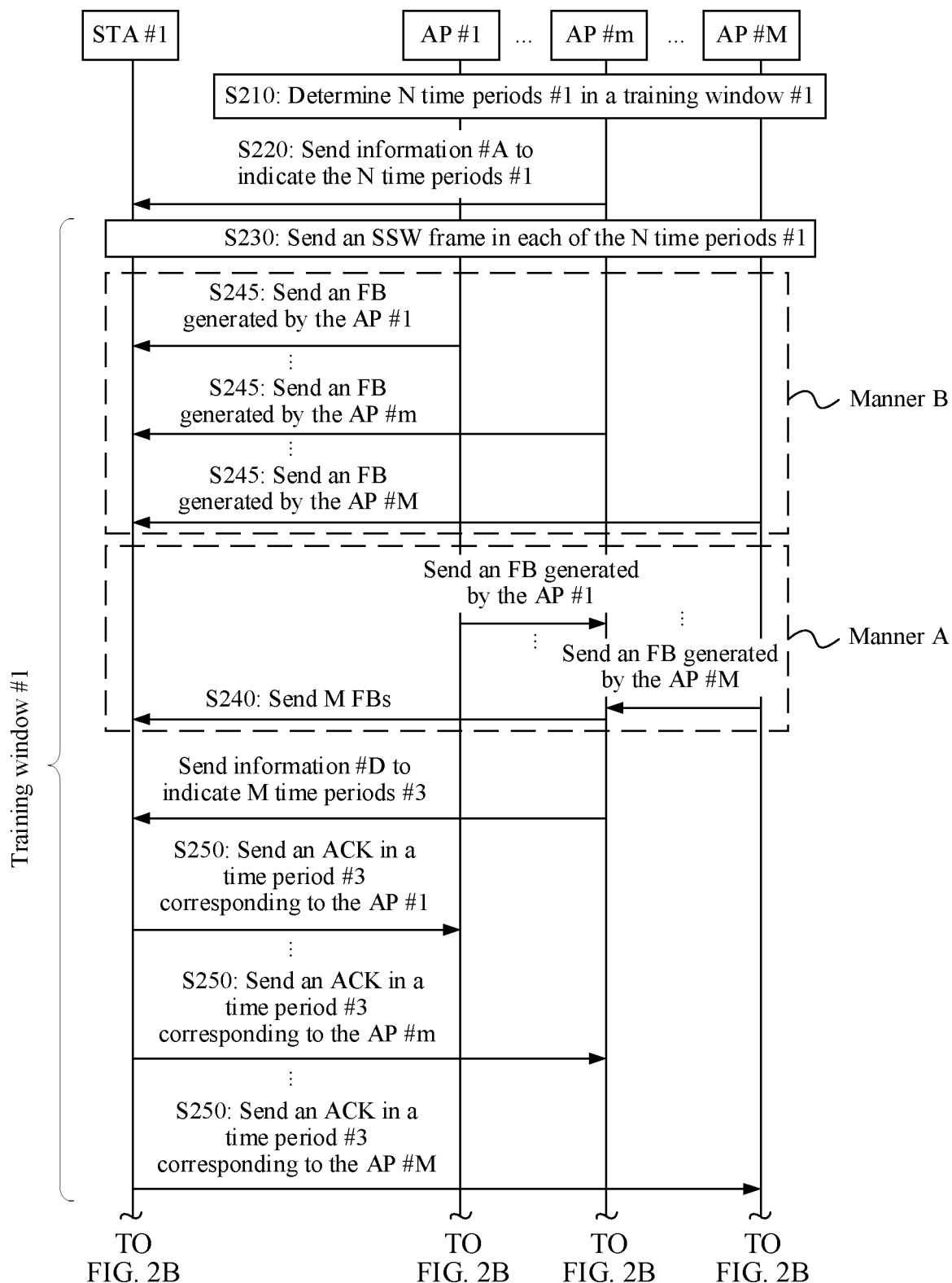
FIG. 2A and FIG. 2B are a schematic interaction diagram of an example of a beam training method according to this application.
Figure 2B:
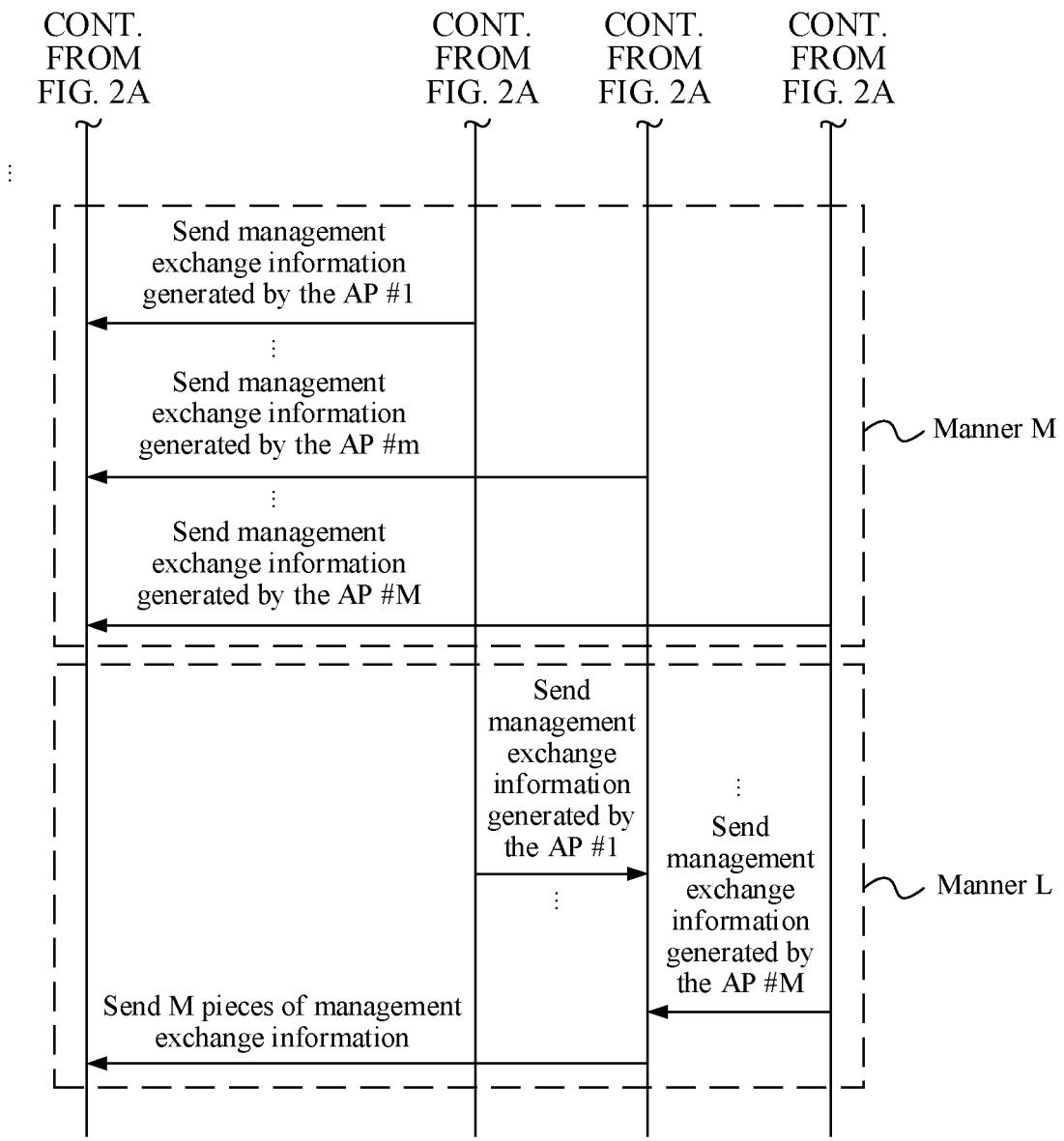

The following describes in detail a beam training method 200 in this application with reference to the accompanying drawings. FIG. 2A and FIG. 2B show the beam training process in this application. Without loss of generality, the method is performed by a STA #1 (namely, an example of a sending device) and a plurality of (for example, M) APs (namely, examples of receiving devices), which are denoted as: an AP #1, an AP #2, . . . , and an AP #M. M is an integer greater than or equal to 2.

In addition, in this application, processing processes of the APs may be similar. Unless otherwise specified, a processing process of the AP #m (namely, an example of a first receiving device) is used as an example for description.

In this application, beam training may be performed based on training information (for example, an SSW frame). A process of transmitting an SSW frame between the STA and the AP is first described.

As shown in FIG. 2A, in S210, a device #A may determine N moments #1 (namely, examples of first moments) in a training window #1 (namely, an example of a first training window).

Alternatively, the M APs may determine the N moments #1 through negotiation. This is not particularly limited in this application.

The N moments #1 are moments at which the STA #1 sends SSW frames (namely, examples of the training information) in the training window #1.

As an example instead of a limitation, in this application, selection of the device #A may include the following cases:

Case 1: When no serving AP of the STA #1 exists in the M APs, the device #A may be any AP in the M APs. For example, as an example instead of a limitation, the device #A may be an AP that is in the M APs and that is first discovered by the STA #1, or the device #A may be an AP that is in the M APs and that first discovers the STA #1.

Case 2: When a serving AP of the STA #1 exists in the M APs, the device #A may be the serving AP of the STA #1.

Case 3: The device #A may be a controller of the M APs. To be specific, the device #A may have a communication connection (for example, a wired communication connection or a wireless communication connection) with each of the M APs. In other words, the device #A can perform wired or wireless communication with each of the M APs. For example, the device #A may be integrated into an AP in the M APs, or the device #A is an AP in the M APs, or the device #A may be independently configured. This is not particularly limited in this application.

In this application, for example, in an asynchronous sweep phase or a device discovery phase, the device #A may negotiate with all of the M APs to determine the N moments #1 in the training window #1.

The device #A may determine the training window #1.

Specifically, in this application, there may be one or more training windows, and a plurality of training windows may appear periodically. One training window may be used for training one beam used by the STA.

In addition, in this application, quantities and locations of SSW frame sending moments in all the training windows may be the same. In this case, the training window #1 may be each of the plurality of training windows.

Alternatively, in this application, quantities or locations of SSW frame sending moments in some training windows may be different. In this case, the training window #1 may be the 1$^{st}$ training window after the asynchronous sweep phase.

In addition, the device #A may determine a value of N.

Specifically, in this application, to ensure that each of the plurality of APs can complete sweep and training on a sector used by the AP, the value of N may be greater than or equal to a quantity A. The quantity A indicates a quantity of sectors used by a specified AP in the M APs, and the specified AP is an AP that is in the M APs and that uses a maximum quantity of sectors.

Herein, it should be noted that, in this application, the "sector used by the AP (for example, the AP #m)" may be a part of all sectors provided by the AP #m.

Alternatively, the "sector used by the AP (for example, the AP #m)" may be all sectors provided by the AP #m.

It should be understood that the foregoing listed manner for setting the value of N is merely an example for description, and this application is not limited thereto. N may be any value greater than or equal to 1. For example, the device #A may alternatively determine the value of N. For example, a manufacturer or an operator may estimate a maximum quantity B of sectors that can be supported by the AP, and configure information about the quantity B in the device #A, so that the device #A determines the value of N based on the quantity B. For example, the value of N may be greater than or equal to the quantity B.

In this application, the N moments #1 in the training window #1 may be determined by the device #A.

Alternatively, the N moments #1 in the training window #1 may be determined by the device #A and the M APs through negotiation.

In addition, as an example instead of a limitation, in this application, the N moments #1 in the training window #1 may be determined based on one or more of the following information:

A. Size of the SSW Frame (in Other Words, a Size of an Occupied Time Domain Resource)

To be specific, the device #A may enable a time interval between any two adjacent moments #1 in the N moments #1 to be greater than or equal to transmission duration of the SSW frame.

B. Time Required for Beam Training Processing of Each AP

To be specific, the device #A may enable a time interval between any two adjacent moments #1 in the N moments #1 to be greater than or equal to a time in which the AP determines, based on the received SSW frame, communication quality of a used beam.

C. Idle Moments of the APs

To be specific, the device #A may enable the N moments #1 to be located at the idle moments of the APs, so that other processing (for example, transmission with another device) performed by the AP does not affect SSW frame receiving.

D. Idle Moments of the STA #1

To be specific, the device #A may enable the N moments #1 to be located at the idle moments of the STA #1, so that other processing (for example, transmission with another device) performed by the STA #1 does not affect SSW frame sending.

It should be understood that the foregoing list parameters or information used to determine the N moments #1 in the training window #1 are merely examples for description, and this application is not limited thereto, provided that the STA #1 can send the SSW frames at the N moments #1, and each AP can measure communication quality of each beam in the training window #1 based on each received SSW frame.

As an example instead of a limitation, in this application, each moment #1 may include one or more time units.

For example, one time unit may include one or more symbols (symbol).

To be specific, in this application, one slot may include one or more moments #1. In other words, one or more SSW frames may be transmitted in one slot.

It should be noted that in S210, the device #A may further send information (namely, an example of first information) about the moments #1 to the APs, so that each AP can learn of a moment (namely, a first moment) at which the STA #1 sends the SSW frame.

In this application, S210 may be completed in or before the discovery phase between the AP and the STA.

Alternatively, S210 may be completed in an asynchronous sweep process.

In addition, in this application, the STA #1 may further send request information to the device #A, where the request information may be used to request the device #A to allocate, to the STA #1, the moment for sending the SSW frame.

In S220, the device #A may send information #A (namely, an example of the first information) to the STA #1, where the information #A may be used to indicate the N moments #1 at which the STA #1 sends the SSW frames in the training window #1.

As an example instead of a limitation, the information #A may include but is not limited to the following forms.

Form 1

The information #A may include indication information of each moment #1.

For example, the information #A may indicate an absolute time period corresponding to each of the N moments #1.

Alternatively, the information #A may indicate a relative time period of each of the N moments #1 relative to a preset reference moment (for example, a start moment or an end moment of the training window #1).

Form 2

The information #A may include indication information of the $1^{st}$ moment #1 in the N moments #1.

For example, the information #A may indicate an absolute time period corresponding to the $1^{st}$ moment #1.

Alternatively, the information #A may indicate a relative time period of the $1^{st}$ moment #1 relative to a preset reference moment (for example, a start moment or an end moment of the training window #1).

In addition, in this application, a time interval between any two of the N moments #1 may be the same.

As an example instead of a limitation, the time interval may include a specified quantity of time units, for example, symbols.

In this case, the information #A may include indication information of the time interval. For example, the information #A may indicate the quantity of time units (for example, slots) included in the time interval.

Form 3

The information #A may include indication information of the $1^{st}$ moment #1 in the N moments #1.

For example, the information #A may indicate an absolute time period corresponding to the $1^{st}$ moment #1.

Alternatively, the information #A may indicate a relative time period of the $1^{st}$ moment #1 relative to a preset reference moment (for example, a start moment or an end moment of the training window #1).

The information #A may include indication information of a time interval between each moment #1 and the $1^{st}$ moment #1. For example, the information #A may indicate N-1 time intervals, the N-1 time intervals are in a one-to-one correspondence with the N-1 moments #1, and each time interval is a time interval between a corresponding moment #1 and the $1^{st}$ moment #1.

Form 4

In this application, the training window #1 may include a plurality of slots.

The plurality of slots are classified into a slot (denoted as a target slot) that includes the moment #1 and a slot that does not include the moment #1.

In this case, the information #A may be used to indicate the $1^{st}$ slot that includes the moment #1 and that is in the training window #1, that is, the $1^{st}$ target slot.

In addition, the information #A may be used to indicate a quantity of SSW frames carried in each target slot.

In addition, the information #A may be used to indicate a time interval between two adjacent target slots.

Form 5

If the device #A is the serving AP of the STA #1, the device #A may allocate, to the STA #1 by using scheduling information, for example, a time division duplex (TDD slot schedule element, slots used for communication. In this case, the information #A may be carried in the scheduling information, and the information #A may be used to indicate slots used for uplink transmission and slots used for downlink transmission that are in the slots allocated to the STA #1 for communication.

Therefore, the STA #1 may send the SSW frame in the slot used for uplink transmission.

In addition, in this case, a quantity of SSW frames carried in each slot may be specified in a communications protocol, or may be indicated in advance by the device #A. This is not particularly limited in this application.

In addition, the slot used to send the SSW frame may be some or all of the slots used for uplink transmission. This is not particularly limited in this application.

When the slot used to send the SSW frame is some of the slots used for uplink transmission, the information #A may be used to indicate the $1^{st}$ slot used to send the SSW frame.

Alternatively, the information #A may be used to indicate a time interval between two adjacent slots used to send the SSW.

Figure 3:
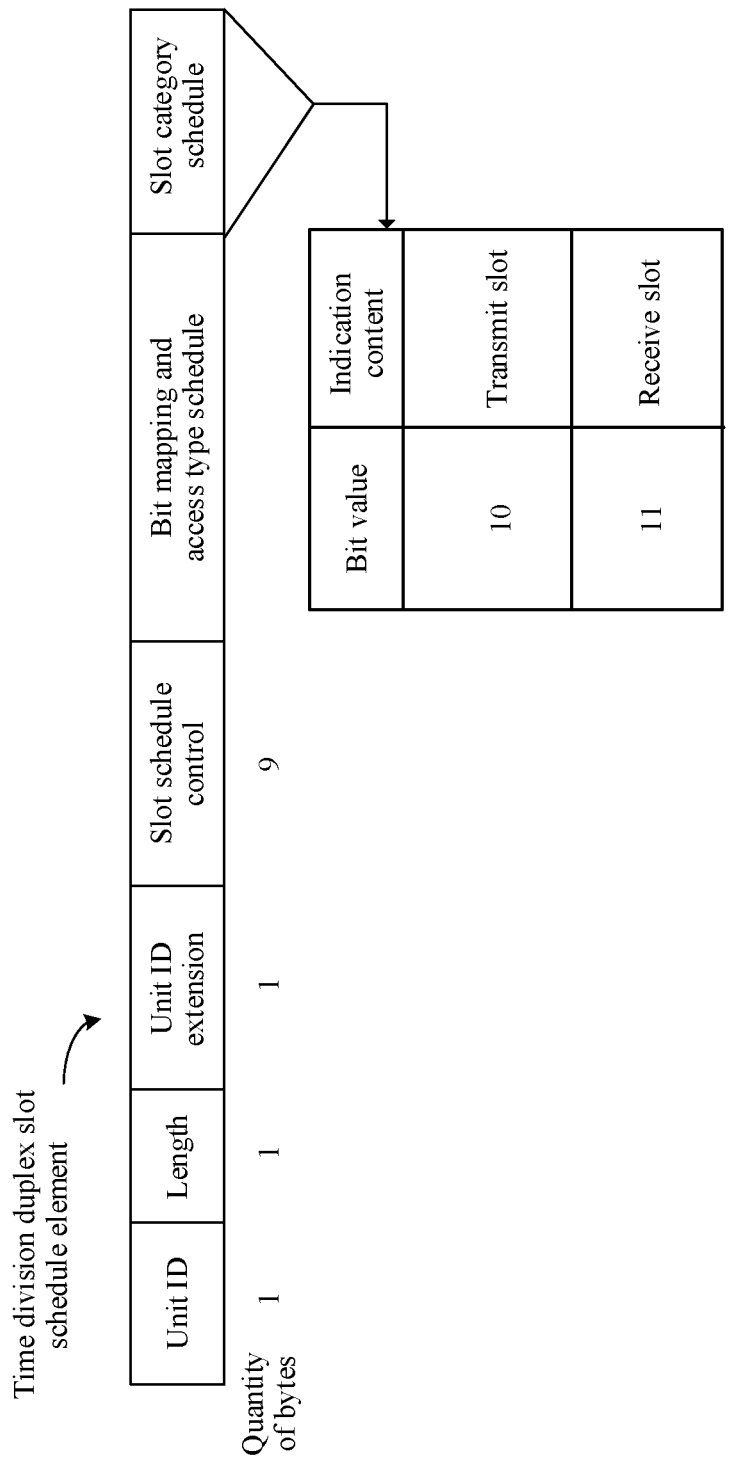
FIG. 3 is a schematic diagram of an example of a structure of a time division duplex slot schedule element according to this application.

FIG. 3 is a schematic diagram of an example of a structure of the TDD slot schedule element according to this application. As shown in FIG. 3, the information #A may be carried in a slot category schedule field.

For example, a reserved value (for example, "10" or "11") in the slot category schedule field in the TDD slot schedule element may be used to indicate the slot used for uplink transmission and the slot used for downlink transmission. In addition, the $1^{st}$ slot in each training window may be defined as a target slot.

It should be understood that the foregoing list forms of the information #A are merely examples for description, and this application is not limited thereto. The form of the information #A may be randomly changed, provided that the STA #1 can accurately determine the N moments #1 indicated by the device #A.

In this application, S220 may be completed in or before the discovery phase between the AP and the STA.

Alternatively, S220 may be completed in the asynchronous sweep process.

In S230, the STA #1 may determine the N moments #1 in the training window #1 based on the information #A.

In addition, the STA #1 may send the SSW frame through a beam #A (namely, an example of a first beam) at each moment #1. In other words, the STA #1 sends the SWW frame N times through the beam #A in the training window #1.

Figure 4:
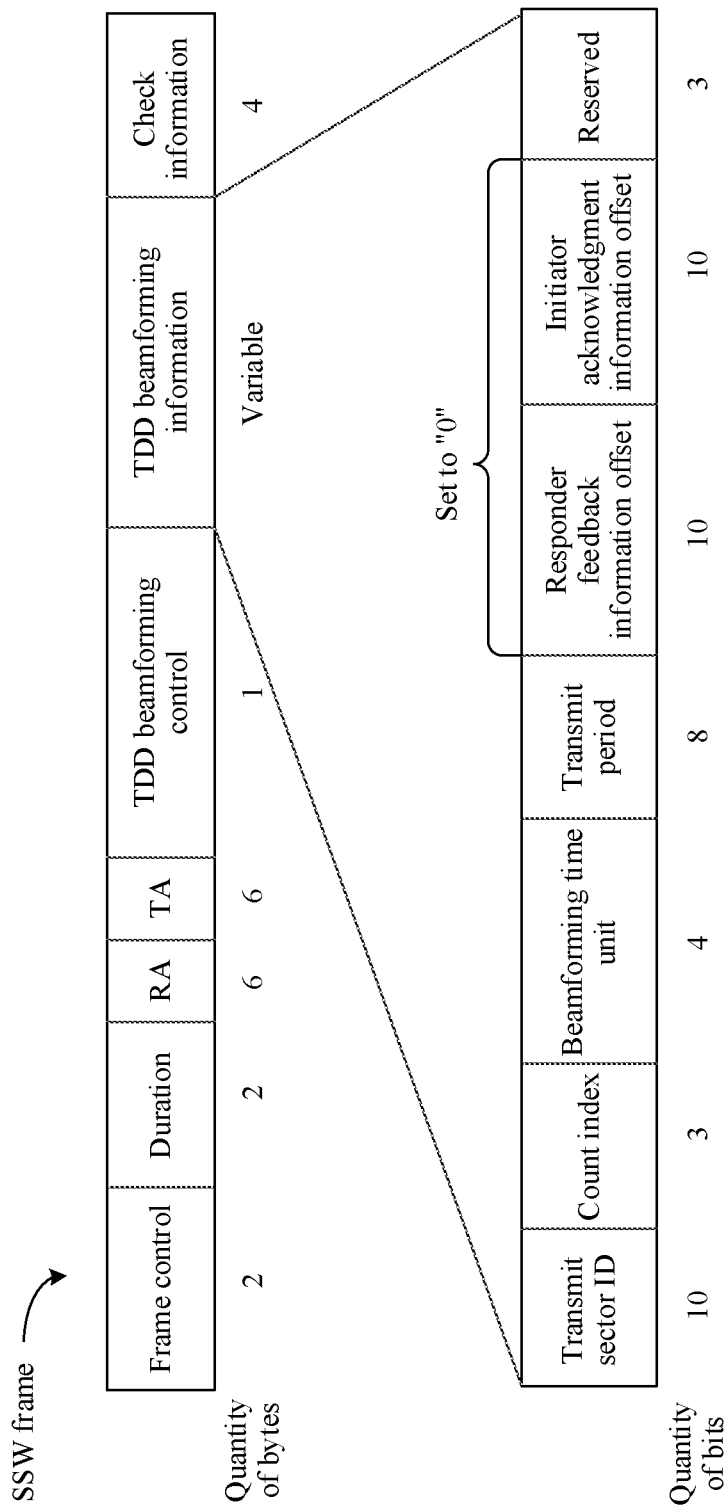
FIG. 4 is a schematic diagram of an example of a sector sweep frame according to this application.

FIG. 4 is a schematic diagram of an example of the SSW frame according to this application. As shown in FIG. 4, different from an SWW frame in a current technology, the SWW frame in this application is sent by the STA, and therefore, a responder feedback offset (responder feedback offset) field and an initiator acknowledgment offset (initiator ack offset) field in the SSW frame do not need to carry corresponding indication information.

In this case, the STA #1 may set values of the responder feedback offset field and the initiator ack offset field to null.

Alternatively, the STA #1 may set values of the responder feedback offset field and the initiator ack offset field to specified values, for example, "0".

Therefore, each AP may receive, in the training window #1 based on the N moments #1, the SSW frame sent by the STA #1, and measure the SSW frame.

Without loss of generality, a processing process of the AP #m is used as an example for description.

It is assumed that a quantity of sectors used by the AP #m is S. As shown above, S is less than or equal to N.

The AP #m may determine S moments #1 in the N moments #1.

The S moments #1 may be any S moments in the N moments #1.

For example, the S moments #1 may be first S moments in the N moments #1.

In this application, the S moments #1 and the S sectors have the following logical relationship: The S moments #1 are in a one-to-one correspondence with the S sectors.

To be specific, it is assumed that a moment #1_s in the S moments #1 corresponds to a sector _s in the S sectors, and s∈[1, S]. In this case, the AP #m receives, at the moment #1_s through the sector _s (in other words, a beam corresponding to the sector _s), the SSW frame sent by the STA #1.

In this application, after receiving the SSW frame through each sector, the AP may determine communication quality of each sector for the beam #A based on received quality of the SSW frame.

That is, the AP #m may determine the communication quality of the sector _s, to be specific, the communication quality of the sector _s for the beam #A.

Similarly, the AP #m may determine communication quality of each of the S sectors, to be specific, the communication quality of each sector for the beam #A.

In addition, the AP #m may generate a list (list) #m, and the list #m may be used to record received quality that is of each of the S sectors used by the AP #m and that is for the beam #A.

In addition, the AP #m may determine a sector with optimal communication quality in the S sectors, and the sector with optimal communication quality is denoted as a sector #m.

Similarly, each of the M APs may separately generate, in a similar manner, a list used to record received quality that is of each of a plurality of sectors used by the AP and that is for the beam #A.

In addition, the AP #m may generate feedback information (feedback, FB) #m, and the FB #m may be used to indicate that the sector #m is the sector with optimal communication quality for the beam #A.

Similarly, each of the M APs may generate, in a similar manner, an FB used to indicate a sector with optimal communication quality for the beam #A.

In addition, in this application, a measurement (or training) process performed by the AP based on the received SSW frame may be similar to a measurement (or training) process performed by a STA based on a received SSW frame in a current technology. To avoid repetition, detailed descriptions are omitted herein.

In addition, each of the M APs may send the FB (namely, an example of measurement information).

The following describes a process of transmitting the FB between the STA and the AP.

As an example instead of a limitation, in this application, any one of the following manners may be used to send the FB.

Manner A

The AP #m may send the FB #m to a device #B.

As an example instead of a limitation, in this application, selection of the device #B may include the following cases:

Case 4: When no serving (serving) AP of the STA #1 exists in the M APs, the device #B may be any AP in the M APs. For example, as an example instead of a limitation, the device #B may be an AP that is in the M APs and that is first discovered by the STA #1, or the device #B may be an AP that is in the M APs and that first discovers the STA #1.

Case 5: When a serving (serving) AP of the STA #1 exists in the M APs, the device #B may be the serving AP of the STA #1.

Case 6: The device #B may be a controller of the M APs. To be specific, the device #B may have a communication connection (for example, a wired communication connection or a wireless communication connection) with each of the M APs. In other words, the device #B can perform wired or wireless communication with each of the M APs. For example, the device #A may be integrated into an AP in the M APs, or the device #A is an AP in the M APs, or the device #B may be independently configured. This is not particularly limited in this application.

In addition, in this application, the device #B and the device #A may be a same device, or the device #B and the device #A may be different. This is not particularly limited in this application.

In addition, the AP #m may alternatively be used as the device #B.

In this case, the AP #m may receive an FB sent by another AP.

Therefore, the device #B may obtain (for example, receive) the FB generated by each of the M APs.

Therefore, in S240, the device #B may synchronously send obtained FBs to the STA #1 in the training window #1.

For example, the device #B may include the FBs in same signaling in the training window #1, and send the signaling to the STA #1.

Manner B

The device #A may determine M moments #2 (namely, examples of a second moment) in the training window #1 (namely, an example of the first training window).

There is a one-to-one correspondence between the M moments #2 and the M APs, and each moment #2 is a moment at which a corresponding AP sends an FB to the STA #1.

Alternatively, the M APs may determine the M moments #2 through negotiation. This is not particularly limited in this application.

In addition, as an example instead of a limitation, in this application, the M moments #2 in the training window #1 may be determined based on one or more of the following information:

E. Size of the FB (in Other Words, a Size of an Occupied Time Domain Resource)

To be specific, a time interval between any two adjacent moments #2 in the M moments #2 may be greater than or equal to transmission duration of the FB.

F. Time Required for Receiving Processing of the STA #1

To be specific, a time interval between any two adjacent moments #2 in the M moments #2 may be greater than or equal to the time required by the STA #1 to perform receiving processing (for example, demodulation and decoding) on the FB.

G. Idle Moments of the APs

To be specific, the M moments #2 may be located at the idle moments of the APs, so that other processing (for example, transmission with another device) performed by the AP does not affect FB sending.

H. Idle Moments of the STA #1

To be specific, the M moments #2 may be located at the idle moments of the STA #1, so that other processing (for example, transmission with another device) performed by the STA #1 does not affect FB receiving.

It should be understood that the foregoing list parameters or information used to determine the M moments #2 in the training window #1 are merely examples for description, and this application is not limited thereto, provided that the APs can send FBs at the M moments #2 and the STA #1 can receive the FBs of the APs in the training window #1.

It should be noted that the device #A may further send information about each moment #2 to an AP corresponding to the moment #2, so that each AP can learn of a moment (namely, the second moment) for sending the FB.

In this application, a determining process of the moment #2 and a determining process of the moment #1 may be synchronously performed. Alternatively, a determining process of the moment #2 and a determining process of the moment #1 may be asynchronously performed. This is not particularly limited in this application.

In addition, the determining process of the moment #2 may be completed in or before the discovery phase between the AP and the STA.

Alternatively, the determining process of the moment #2 may be completed in the asynchronous sweep process.

In addition, in this application, the STA #1 may further send request information to the device #A, where the request information may be used to request the device #A to determine the moment at which each AP sends the FB.

In addition, the device #A may send information #B (namely, an example of second information) to the STA #1. The information #B may be used to indicate the moment at which each AP sends the FB. For example, the information #B may be used to indicate a correspondence between the M moments #2 and the M APs.

The correspondence may be explicitly indicated by the information #B. To be specific, the information #B may further record an identifier of an AP corresponding to each moment #2.

As an example instead of a limitation, the identifier of the AP may include but is not limited to an internet protocol (IP) address or a media access control (media access control) address of the AP.

Alternatively, the correspondence may be implied by the information #B. To be specific, the STA #1 and the device #A may pre-determine an arrangement sequence of the M APs, and the device #A may arrange, in the information #B, information about the moments #2 based on the arrangement sequence of the M APs. That is, an arrangement sequence of the moments #2 corresponding to the APs may correspond to (for example, be the same as) the arrangement sequence of the APs.

As an example instead of a limitation, the information #B may include but is not limited to the following forms.

Form 6

The information #B may include indication information of each moment #2.

For example, the information #B may indicate an absolute time period corresponding to each of the M moments #2.

Alternatively, the information #B may indicate a relative time period of each of the M moments #2 relative to a preset reference moment (for example, a start moment or an end moment of the training window #1).

Form 7

The information #B may include indication information of the $1^{st}$ moment #2 in the M moments #2.

For example, the information #B may indicate an absolute time period corresponding to the 1$^{st}$ moment #2.

Alternatively, the information #B may indicate a relative time period of the 1$^{st}$ moment #2 relative to a preset reference moment (for example, a start moment or an end moment of the training window #1).

In addition, in this application, a time interval between any two of the M moments #2 may be the same.

As an example instead of a limitation, the time interval may include a specified quantity of time units, for example, symbols.

In this case, the information #B may include indication information of the time interval. For example, the information #B may indicate a quantity of time units (for example, slots) included in the time interval.

Form 8

The information #B may include indication information of the 1$^{st}$ moment #2 in the M moments #2.

For example, the information #B may indicate an absolute time period corresponding to the 1$^{st}$ moment #2.

Alternatively, the information #B may indicate a relative time period of the 1$^{st}$ moment #2 relative to a preset reference moment (for example, a start moment or an end moment of the training window #1).

The information #B may include indication information of a time interval between each moment #2 and the 1$^{st}$ moment #2. For example, the information #B may indicate M-1 time intervals, the M-1 time intervals are in a one-to-one correspondence with the M-1 moments #2, and each time interval is a time interval between a corresponding moment #2 and the 1$^{st}$ moment #2.

It should be understood that the foregoing list forms of the information #B are merely examples for description, and this application is not limited thereto. The form of the information #B may be randomly changed, provided that the STA #1 can accurately determine the M moments #2 indicated by the device #A.

In this application, a sending process of the information #B may be completed in or before the discovery phase between the AP and the STA.

Alternatively, a sending process of the information #B may be completed in the asynchronous sweep process.

Therefore, in S245, each AP may send the determined FB to the STA #1 at a corresponding moment #2.

It should be noted that the information #A and the information #B may be synchronously sent. For example, the information #A and the information #B may be different information elements in same signaling. Alternatively, the information #A and the information #B may be asynchronously sent. For example, the information #A and the information #B may be sent at different moments by using different signaling. This is not particularly limited in this application.

As shown above, this application may provide a manner A and a manner B for sending the FB. Therefore, the device #A may further send information #C to the STA #1. The information #C may be used to indicate a target manner used by the AP to send the FB, and the target manner may be one of the manner A or the manner B.

Therefore, the STA #1 may determine, based on the information #C, whether to use the manner A or the manner B to receive the FB.

It should be noted that the information #A and the information #C may be synchronously sent. For example, the information #A and the information #C may be different information elements in same signaling. Alternatively, the information #A and the information #C may be asynchronously sent. For example, the information #A and the information #C may be sent at different moments by using different signaling. This is not particularly limited in this application.

In addition, the information #B and the information #C may be synchronously sent. For example, the information #B and the information #C may be different information elements in same signaling. Alternatively, the information #B and the information #C may be asynchronously sent. For example, the information #B and the information #C may be sent at different moments by using different signaling. This is not particularly limited in this application.

In addition, in this application, a processing process performed by the STA based on the received FB may be similar to a processing process performed by an AP based on a received FB in a current technology. To avoid repetition, detailed descriptions are omitted herein.

Optionally, after receiving the FB sent by each AP, the STA may send acknowledgment information (ACK) to each AP.

The following describes a process of transmitting the ACK between the STA and the AP.

Specifically, the device #A may further determine M moments #3 (namely, examples of a third moment) in the training window #1.

Alternatively, the M APs may determine the M moments #3 through negotiation. This is not particularly limited in this application.

The M moments #3 are moments at which the STA #1 sends M ACKs in the training window #1.

That is, the M moments #3 are in a one-to-one correspondence with the M APs. In other words, the M moments #3 are in a one-to-one correspondence with the M ACKs. Each moment #3 is used to transmit a corresponding ACK. Specifically, each moment #3 is used to transmit an ACK for an FB sent by an AP corresponding to the moment #3.

In this application, the M moments #3 in the training window #1 may be determined by the device #A.

Alternatively, the M moments #3 in the training window #1 may be determined by the device #A and the M APs through negotiation.

In addition, as an example instead of a limitation, in this application, the N moments #1 in the training window #1 may be determined based on one or more of the following information:

I. Size of the ACK (in Other Words, a Size of an Occupied Time Domain Resource)

To be specific, the device #A may enable a time interval between any two adjacent moments #3 in the M moments #3 to be greater than or equal to transmission duration of the ACK.

J. Idle Moments of the APs

To be specific, the device #A may enable the M moments #3 to be located at the idle moments of the APs, so that other processing (for example, transmission with another device) performed by the AP does not affect ACK receiving.

K. Idle Moments of the STA #1

To be specific, the device #A may enable the M moments #3 to be located at the idle moments of the STA #1, so that other processing (for example, transmission with another device) performed by the STA #1 does not affect ACK sending.

It should be understood that the foregoing listed parameters or information used to determine the M moments #3 in the training window #1 are merely examples for description, and this application is not limited thereto, provided that the STA #1 can send the ACKs at the M moments #3 and each AP can receive the ACK in the training window #1.

As an example instead of a limitation, in this application, each moment #3 may include one or more time units.

For example, one time unit may include one or more symbols.

For another example, one time unit may include one or more slots.

It should be noted that the device #A may further send information about the moment #3 to each AP, so that each AP can learn of the moment (namely, the third moment) at which the STA #1 sends the ACK.

In this application, a determining process of the moment #3 may be completed in or before the discovery phase between the AP and the STA.

Alternatively, a determining process of the moment #3 may be completed in the asynchronous sweep process.

The device #A may send information #D (namely, an example of fourth information) to the STA #1, and the information #D may be used to indicate the M moments #3 at which the STA #1 sends the ACKs in the training window #1. For example, the information #D may be used to indicate a mapping relationship between the M moments #3 and the M APs.

As an example instead of a limitation, the information #D may include but is not limited to the following forms.

Form 9

The information #D may include indication information of each moment #3.

For example, the information #D may indicate an absolute time period corresponding to each of the M moments #3.

Alternatively, the information #D may be a relative time period of each of the M moments #3 relative to a preset reference moment (for example, a start moment or an end moment of the training window #1).

Form 10

The information #D may include indication information of the $1^{st}$ moment #3 in the M moments #3.

For example, the information #D may indicate an absolute time period corresponding to the $1^{st}$ moment #3.

Alternatively, the information #D may indicate a relative time period of the $1^{st}$ moment #3 relative to a preset reference moment (for example, a start moment or an end moment of the training window #1).

In addition, in this application, a time interval between any two of the M moments #3 may be the same.

As an example instead of a limitation, the time interval may include a specified quantity of time units, for example, symbols.

In this case, the information #D may include indication information of the time interval. For example, the information #D may indicate the quantity of time units (for example, slots) included in the time interval.

Form 11

The information #D may include indication information of the $1^{st}$ moment #3 in the M moments #3.

For example, the information #D may indicate an absolute time period corresponding to the $1^{st}$ moment #3.

Alternatively, the information #D may indicate a relative time period of the $1^{st}$ moment #3 relative to a preset reference moment (for example, a start moment or an end moment of the training window #1).

The information #D may include indication information of a time interval between each moment #3 and the $1^{st}$ moment #3. For example, the information #D may indicate M-1 time intervals, the M-1 time intervals are in a one-to-one correspondence with the M-1 moments #3, and each time interval is a time interval between a corresponding moment #3 and the $1^{st}$ moment #3.

It should be understood that the foregoing list forms of the information #D are merely examples for description, and this application is not limited thereto. The form of the information #D may be randomly changed, provided that the STA #1 can accurately determine the M moments #3 indicated by the device #A.

In this application, a sending process of the information #D may be completed in or before the discovery phase between the AP and the STA.

Alternatively, a sending process of the information #D may be completed in the asynchronous sweep process.

Therefore, in S250, the STA #1 may send the ACK to each AP at a moment #3 corresponding to each AP.

It should be noted that the information #A and the information #D may be synchronously sent. For example, the information #A and the information #D may be different information elements in same signaling. Alternatively, the information #A and the information #D may be asynchronously sent. For example, the information #A and the information #D may be sent at different moments by using different signaling. This is not particularly limited in this application.

In addition, the information #B and the information #D may be synchronously sent. For example, the information #B and the information #D may be different information elements in same signaling. Alternatively, the information #B and the information D may be asynchronously sent. For example, the information #B and the information #D may be sent at different moments by using different signaling. This is not particularly limited in this application.

In addition, the information #C and the information #D may be synchronously sent. For example, the information #C and the information #D may be different information elements in same signaling. Alternatively, the information #C and the information #D may be asynchronously sent. For example, the information #C and the information #D may be sent at different moments by using different signaling. This is not particularly limited in this application.

In addition, in this application, a processing process performed by the AP based on the received ACK may be similar to a processing process performed by a STA based on a received ACK in a current technology. To avoid repetition, detailed descriptions are omitted herein.

In this way, the training process for the beam #A is completed.

Optionally, in this application, in some training windows, the SSW frame may alternatively be sent by the AP. In other words, in this application, there may be two sending manners: a sending manner 1 and a sending manner 2. In the sending manner 1, the SSW frame is sent by the STA. This is the beam training method provided in this application. In the sending manner 2, the SSW frame is sent by the AP. This training process may be similar to that in a current technology.

In this case, the device #A may further send information #F to the STA #1, and the information #F may be used to indicate whether the SSW frame sending manner is the sending manner 1 or the sending manner 2. Therefore, when determining that the SSW frame sending manner indicated by the information #F is the sending manner 1, the STA #1 starts the processing process of this application.

It should be noted that the information #A and the information #F may be synchronously sent. For example, the information #A and the information #F may be different information elements in same signaling. Alternatively, the information #A and the information #F may be asynchronously sent. For example, the information #A and the information #F may be sent at different moments by using different signaling. This is not particularly limited in this application.

In addition, the information #B and the information #F may be synchronously sent. For example, the information #B and the information #F may be different information elements in same signaling. Alternatively, the information #B and the information #F may be asynchronously sent. For example, the information #B and the information #F may be sent at different moments by using different signaling. This is not particularly limited in this application.

In addition, the information #C and the information #F may be synchronously sent. For example, the information #C and the information #F may be different information elements in same signaling. Alternatively, the information #C and the information #F may be asynchronously sent. For example, the information #C and the information #F may be sent at different moments by using different signaling. This is not particularly limited in this application.

In addition, the information #D and the information #F may be synchronously sent. For example, the information #D and the information #F may be different information elements in same signaling. Alternatively, the information #D and the information #F may be asynchronously sent. For example, the information #D and the information #F may be sent at different moments by using different signaling. This is not particularly limited in this application.

Figure 5:
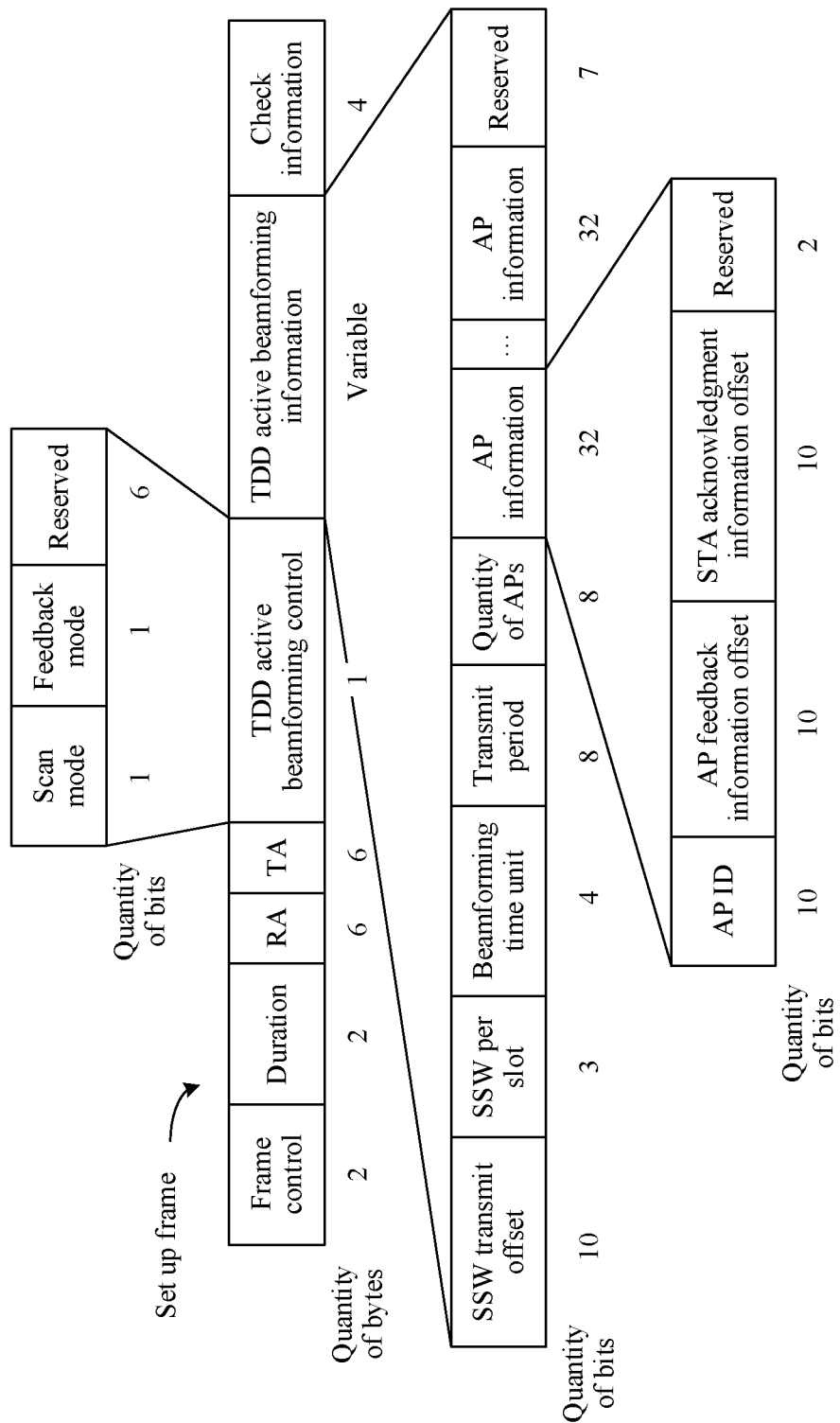
FIG. 5 is a schematic diagram of an example of a set up frame according to this application.

As an example instead of a limitation, in this application, the information #A, the information #B, the information #C, the information #D, and the information #F may be carried in same signaling. For example, the signaling may be referred to as a set up frame. FIG. 5 is a schematic diagram of an example of a structure of the set up frame.

As shown in FIG. 5, the set up frame may include:

a frame control field, used to carry frame-related information, for example, indication information of a type of the frame;

a duration field, used to carry indication information of duration of the frame;

a receiver address (RA) field, used to carry a receiver address of the set up frame;

a transmitter address (TA) field, used to carry a transmitter address of the set up frame;

a frame check sequence (FCS) field, used to carry check information, so that a receive end station can check integrity of the frame;

a time division duplex active beamforming control (TDD active beamforming control) field, which may include a scan mode field, a feedback mode (feedback mode) field, and a reserved field, where the information #F may be carried in the scan mode field, and the information #C may be carried in the feedback mode field; and a time division duplex (TDD) active beamforming information field, which may include a sector sweep frame transmit offset (SSW transmit offset) field, a sector sweep frame per slot (SSW per slot) field, a beamforming time unit field, a transmit period (transmit period) field, a quantity of APs field, a plurality of AP information fields, and a reserved field.

The information #A may be carried in the sector sweep frame transmit offset (SSW transmit offset) field and the sector sweep frame per slot (SSW per slot) field. For example, a form of the information #A may be, for example, the foregoing form 4. Information carried in the SSW transmit offset field may be used to indicate an offset between target slots. Information carried in the SSW per slot field may be used to indicate a quantity of SSW frames carried in each target slot. In addition, in this case, the $1^{st}$ slot that includes the moment #1 and that is in the training window #1 may be considered as the $1^{st}$ slot in the training window #1 by default.

In addition, the information #B may be carried in an AP feedback information offset (AP feedback offset) field in the AP information field, and the information #D may be carried in a STA acknowledgment information offset (STA ACK offset) field in the AP information field.

It should be understood that the structure of the set up frame shown in FIG. 5 is merely an example for description and is not particularly limited in this application. The structure of the set up frame can be randomly changed provided that reliable transmission of the information #A, the information #B, the information #C, the information #D, and the information #F can be ensured. For example, the set up frame may include only some of the information #A, the information #B, the information #C, the information #D, and the information #F, and information that is not carried in the set up frame is transmitted by using other signaling.

For example, in this application, the reserved field in the TDD active beamforming information field may further carry indication information used to indicate the value of N.

In addition, in this application, the STA #1 may use another beam in addition to the beam #A. Therefore, training of one or more beams other than the beam #A may be further performed in one or more training windows after the training window #1. Each training window may be used for training one beam.

As an example instead of a limitation, for example, a training process of another beam may be similar to a training process of the beam #A. For example, the device #A may deliver a moment at which the STA #1 sends an SSW, a moment at which each AP sends an FB, and a moment at which the STA #1 sends an ACK.

Alternatively, related information (which may include, for example, information about parameters such as the moment at which the STA #1 sends the SSW, the moment at which the AP sends the FB, a feedback manner of the FB, and the moment at which the STA #1 sends the ACK) of a training process of a beam #x performed in a training window #x may be carried in an FB delivered in a training window #y. The training window #y is a next training window of the training window #x.

For example, it is assumed that a training window after the training window #1 is a training window #2, and it is assumed that training of a beam #B is to be performed in the training window #2.

In this case, information (denoted as information #E, where the information #E may indicate, for example, the moment at which the STA #1 sends the SSW, the moment at which the AP sends the FB, the feedback manner of the FB, and the moment at which the STA #1 sends the ACK) used for training of the beam #B may be carried in an FB #m.

As an example instead of a limitation, each AP may include related information of a next training window in an FB of the AP. Alternatively, related information of a next training window of each AP may be carried in a same FB.

After training of each beam used by the STA #1 is completed, each AP may send management exchange information (in other words, a measurement information set, namely, another example of measurement information) to the STA #1. The management exchange information may include a list corresponding to each beam, and a list corresponding to each beam may be used to record received quality that is of each of a plurality of sectors used by the AP and that is for the beam.

As shown in FIG. 5, in this application, each AP and the STA may determine an SSW sending moment based on information carried in the SSW transmit offset field, the SSW per slot field, the beamforming time unit field, and the transmit period field in the set up frame.

In addition, each AP and the STA may determine the FB sending moment and the ACK sending moment based on information carried in each AP information field in the set up frame. For example, as shown in FIG. 5, for an AP information field, information in an AP feedback offset field in the AP information field may indicate an FB sending moment of an AP indicated by an AP ID in the AP information field, and the information in a STA ACK offset field in the AP information field may indicate an ACK receiving moment of the AP indicated by the AP ID in the AP information field.

Specifically, one of a plurality of APs may send the set up (set up) frame to the STA in, for example, an asynchronous sweep phase. A structure of the set up frame may be shown in FIG. 5. To be specific, the set up frame may carry indication information of a plurality of SSW frame sending moments, indication information of an FB sending moment of each of the plurality of APs, and indication information of an ACK receiving moment of each of the plurality of APs, so that the STA can send a plurality of SSW frames based on the indication information of the SSW frame sending moments, and each AP may receive each SSW frame based on the indication information of the SSW frame sending moment, and generate an FB based on the received SSW frame. Then, each AP (for example, the AP #m) may send an FB to the STA at an FB sending moment that is indicated in the set up frame and that corresponds to the AP #m, and the STA may determine, as the FB of the AP #m, the FB received at the FB sending moment that is indicated in the set up frame and that corresponds to the AP #m. In addition, the STA sends, at an ACK receiving moment that is indicated in the set up frame and that corresponds to each AP (for example, the AP #m), an ACK to the AP #m. Correspondingly, the AP #m may receive the ACK from the STA at the ACK receiving moment that is indicated in the set up frame and that corresponds to the AP #m.

The following describes a process of transmitting the management exchange information of the FB between the STA and the AP.

As an example instead of a limitation, in this application, any one of the following manners may be used to send the management exchange information.

Manner L

The AP #m may send management exchange information #m (namely, management exchange information generated by the AP #m, which may include a list determined by the AP #m based on training performed by the STA by using beams) to a device #C.

As an example instead of a limitation, in this application, selection of the device #C may include the following cases:

Case 7: When no serving (serving) AP of the STA #1 exists in the M APs, the device #C may be any AP in the M APs. For example, as an example instead of a limitation, the device #C may be an AP that is in the M APs and that is first discovered by the STA #1, or the device #C may be an AP that is in the M APs and that first discovers the STA #1.

Case 8: When a serving (serving) AP of the STA #1 exists in the M APs, the device #C may be the serving AP of the STA #1.

Case 9: The device #C may be a controller of the M APs. To be specific, the device #C may have a communication connection (for example, a wired communication connection or a wireless communication connection) with each of the M APs. In other words, the device #C can perform wired or wireless communication with each of the M APs. For example, the device #C may be integrated into an AP in the M APs, or the device #C is an AP in the M APs, or the device #B may be independently configured. This is not particularly limited in this application.

In addition, in this application, the device #C and the device #A may be a same device, or the device #C and the device #A may be different. This is not particularly limited in this application. In addition, in this application, the device #C and the device #B may be a same device, or the device #C and the device #B may be different. This is not particularly limited in this application.

In addition, the AP #m may alternatively be used as the device #C.

In this case, the AP #m may receive management exchange information sent by another AP.

Therefore, the device #C may obtain (for example, receive) management exchange information generated by each of the M APs.

Therefore, the device #C may synchronously send all obtained management exchange information to the STA #1.

For example, the device #C may include management exchange information of all the APs in same signaling, and send the signaling to the STA #1.

Manner M

The device #C may determine M moments #4 (namely, another example of the second moment).

There is a one-to-one correspondence between the M moments #4 and the M APs, and each moment 4 is a moment at which a corresponding AP sends the management exchange information to the STA #1.

Alternatively, the M APs may determine the M moments #4 through negotiation. This is not particularly limited in this application.

In addition, as an example instead of a limitation, in this application, the M moments #4 may be determined based on one or more of the following information:

K. Size of the Management Exchange Information (in Other Words, a Size of an Occupied Time Domain Resource)

To be specific, a time interval between any two adjacent moments #4 in the M moments #4 may be greater than or equal to transmission duration of the management exchange information.

L. Time Required for Receiving Processing of the STA #1

To be specific, a time interval between any two adjacent moments #4 in the M moments #4 may be greater than or equal to the time required by the STA #1 to perform receiving processing (for example, demodulation and decoding) on the management exchange information.

M. Idle Moments of the APs

To be specific, the M moments #4 may be located at the idle moments of the APs, so that other processing (for example, transmission with another device) performed by the AP does not affect management exchange information sending.

N. Idle Moments of the STA #1

To be specific, the M moments #4 may be located at the idle moments of the STA #1, so that other processing (for example, transmission with another device) performed by the STA #1 does not affect management exchange information receiving.

It should be understood that the foregoing listed parameters or information used to determine the M moments #4 are merely examples for description, and this application is not limited thereto, provided that the APs can send the management exchange information at the M moments #4 and the STA #1 can receive the management exchange information of the APs.

It should be noted that the device #C may further send information about each moment #4 to an AP corresponding to the moment #4, so that each AP can learn of a moment for sending the management exchange information.

In this application, a determining process of the moment #4 and a determining process of the moment #1 may be synchronously performed. Alternatively, a determining process of the moment #4 and a determining process of the moment #1 may be asynchronously performed. This is not particularly limited in this application.

In addition, in this application, a determining process of the moment #4 and a determining process of the moment #2 may be synchronously performed. Alternatively, a determining process of the moment #4 and a determining process of the moment #2 may be asynchronously performed. This is not particularly limited in this application.

In addition, the determining process of the moment #4 may be completed in or before the discovery phase between the AP and the STA.

Alternatively, the determining process of the moment #4 may be completed in the asynchronous sweep process.

In addition, in this application, the STA #1 may further send request information to the device #C, where the request information may be used to request the device #C to determine the moment at which each AP sends the management exchange information.

In addition, the device #C may send information #G (namely, another example of the second information) to the STA #1, where the information #G may be used to indicate the moment at which each AP sends the management exchange information. For example, the information #G may be used to indicate a correspondence between the M moments #4 and the M APs.

The correspondence may be explicitly indicated by the information #G. To be specific, the information #G may further record an identifier of an AP corresponding to each moment #4.

As an example instead of a limitation, the identifier of the AP may include but is not limited to an internet protocol (IP) address or a media access control address of the AP.

Alternatively, the correspondence may be implied by the information #G. To be specific, the STA #1 and the device #C may pre-determine an arrangement sequence of the M APs, and the device #A may arrange, in the information #G, information about the moments #4 based on the arrangement sequence of the M APs. That is, an arrangement sequence of the moments #4 corresponding to the APs may correspond to (for example, be the same as) the arrangement sequence of the APs.

As an example instead of a limitation, the information #G may include but is not limited to the following forms.

Form 12

The information #G may include indication information of each moment #4.

For example, the information #G may indicate an absolute time period corresponding to each moment #4 in the M moments #4.

Alternatively, the information #G may be a relative time period of each of the M moments #4 relative to a preset reference moment (for example, a start moment or an end moment of the training window #1).

Form 13

The information #G may include indication information of the $1^{st}$ moment #4 in the M moments #4.

For example, the information #G may indicate an absolute time period corresponding to the $1^{st}$ moment #4.

Alternatively, the information #G may indicate a relative time period of the $1^{st}$ moment #4 relative to a preset reference moment (for example, an end moment of a last training window).

In addition, in this application, a time interval between any two of the M moments #4 may be the same.

As an example instead of a limitation, the time interval may include a specified quantity of time units, for example, symbols.

In this case, the information #G may include indication information of the time interval. For example, the information #G may indicate the quantity of time units (for example, slots) included in the time interval.

Form 14

The information #G may include indication information of the $1^{st}$ moment #4 in the M moments #4.

For example, the information #G may indicate an absolute time period corresponding to the first moment #4.

Alternatively, the information #G may indicate a relative time period of the $1^{st}$ moment #4 relative to a preset reference moment (for example, an end moment of a last training window).

The information #G may include indication information of a time interval between each moment #4 and the $1^{st}$ moment #4. For example, the information #G may indicate M-1 time intervals, the M-1 time intervals are in a one-to-one correspondence with the M-1 moments #4, and each time interval is a time interval between a corresponding moment #4 and the $1^{st}$ moment #4.

It should be understood that the foregoing list forms of the information #G are merely examples for description, and this application is not limited thereto. The form of the information #G may be randomly changed, provided that the STA #1 can accurately determine the M moments #4 indicated by the device #C.

In this application, a process of sending the information #G may be completed in or before the discovery phase between the APs and the STA.

Alternatively, a sending process of the information #G may be completed in an asynchronous sweep process.

Therefore, each AP may send the determined management exchange information to the STA #1 at a corresponding moment #4.

As an example instead of a limitation, in this application, the information #G may be carried in the FB.

As shown above, this application may provide the manner L and the manner M for sending the management exchange information. Therefore, the device #C may further send information #H to the STA #1. The information #H may be used to indicate a target manner used by the AP to send the management exchange information, and the target manner may be one of the manner L or the manner M.

Therefore, the STA #1 may determine, based on the information #H, whether to use the manner L or the manner M to receive the management exchange information.

It should be noted that the information #G and the information #H may be synchronously sent. For example, the information #G and the information #H may be different information elements in same signaling. Alternatively, the information #G and the information #H may be asynchronously sent. For example, the information #G and the information #H may be sent at different moments by using different signaling. This is not particularly limited in this application.

In addition, in this application, a processing process performed by the STA based on the received management exchange information may be similar to a processing process performed by an AP based on received management exchange information in a current technology. To avoid repetition, detailed descriptions are omitted herein.

Figure 6:
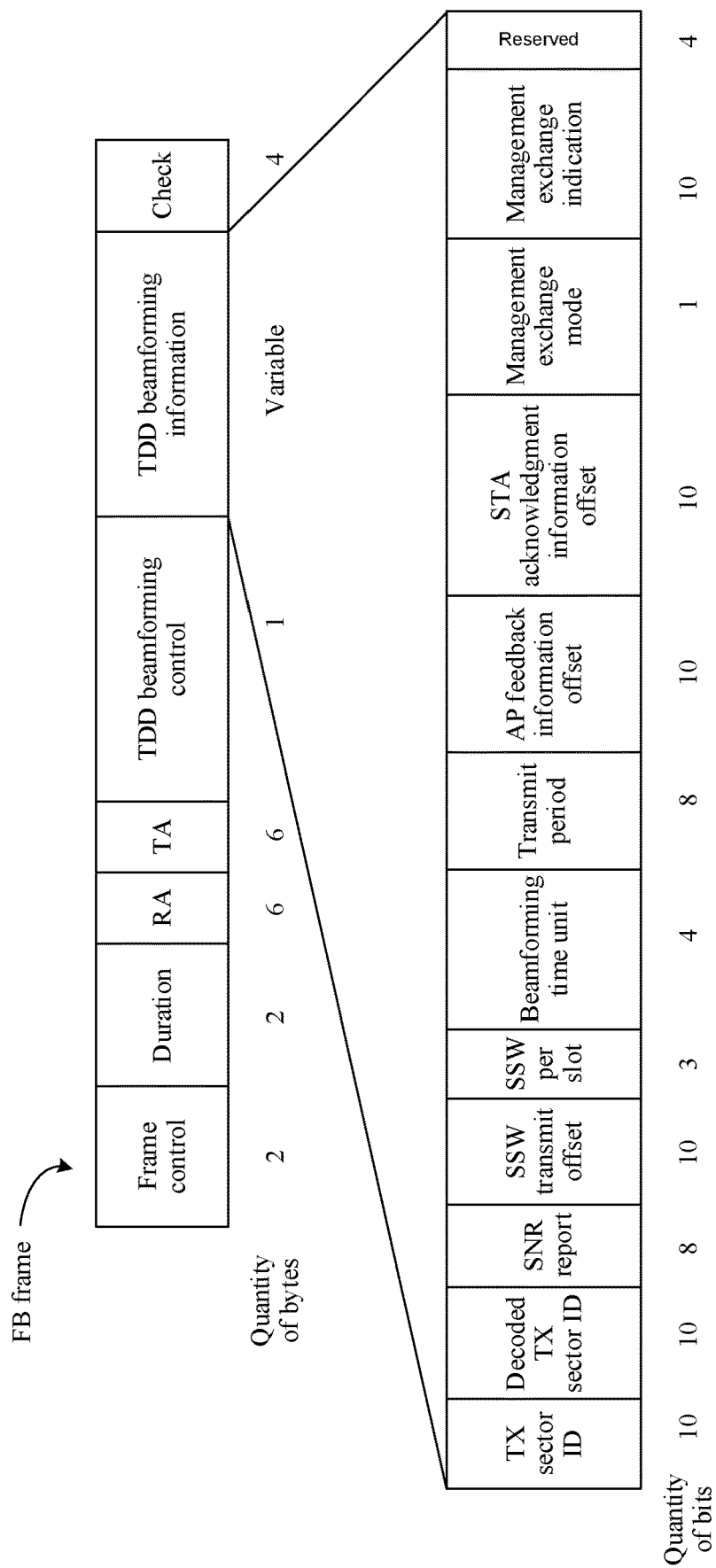
FIG. 6 is a schematic diagram of an example of a feedback frame according to this application.

FIG. 6 shows an example of a structure of an FB frame used to carry an FB according to this application. The FB shown in FIG. 6 carries the information #E, the information #G, and the information #H.

As shown in FIG. 6, the FB frame may include:

a frame control (frame control) field, used to carry frame-related information, for example, indication information of a type of the frame;

a duration field, used to carry indication information of duration of the frame;

a receiver address (RA) field, used to carry a receiver address of the set up frame;

a transmitter address (TA) field, used to carry a transmitter address of the set up frame;

a frame check sequence (FCS) field, used to carry check information, so that a receive end station can check integrity of the frame;

a time division duplex (TDD active beamforming control field; and a time division duplex (TDD) active beamforming information field, which may include: a transmit sector identifier (TX sector ID) field and a decoded transmit sector identifier (decoded TX sector ID) field that are used to carry an identifier of an optimal sector, a signal-to-noise ratio report (SNR report) field used to carry a signal-to-noise ratio of the optimal sector, a sector sweep frame transmit offset (SSW transmit offset) field, a sector sweep frame per slot (SSW per slot) field, a beamforming time unit field, a transmit period field, an AP feedback information offset field, a STA acknowledgment information offset (STA ACK offset) field, a management exchange mode field, a management exchange information field, and a reserved field.

The information #E may be carried in the sector sweep frame transmit offset field, the sector sweep frame per slot field, the feedback information offset field, and the STA acknowledgment information offset field.

The FB #m may be carried in the transmit sector identifier field, the decoded transmit sector identifier field, and the signal-to-noise ratio report field.

The information #H may be carried in the management exchange mode field.

The information #G may be carried in the management exchange indication field.

It should be understood that the structure of the FB frame shown in FIG. 6 is merely an example for description and is not particularly limited in this application. For example, the FB frame may alternatively include only the feedback information, and the information #E, the information #G, and the information #H may be transmitted by using other signaling.

According to the method provided in this application, the APs determine, through negotiation, the sending moment of training information, and the sending moment is notified to the STA, so that the APs can simultaneously receive the training information sent by the STA, and the plurality of APs complete beam training with the same STA in a same window. In addition, the plurality of APs complete respective beam training based on the same training information. In this way, a training time can be shortened, and signaling overheads can be reduced.

It should be understood that sequence numbers of the processes do not mean execution sequences in the foregoing embodiment. The execution sequences of the processes should be determined based on functions and internal logic of the processes, and should not constitute any limitation on the implementation processes of the embodiments of this application.

The method provided in the embodiments of this application is described above in detail with reference to FIG. 2A to FIG. 6. An apparatus provided in the embodiments of this application is described below in detail with reference to FIG. 7.

Figure 7:
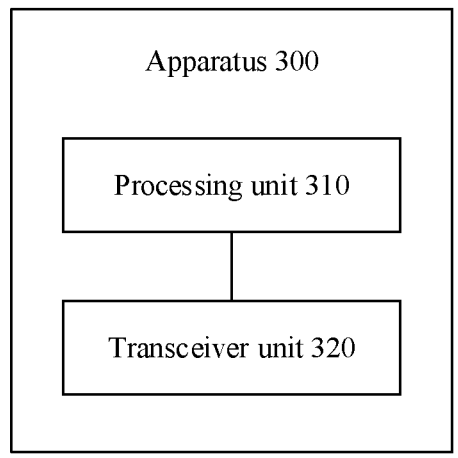
FIG. 7 is a schematic diagram of an example of a beam training apparatus according to this application.

FIG. 7 is a schematic block diagram of a beam training apparatus 300 according to an embodiment of this application. As shown in FIG. 7, the apparatus 300 may include a processing unit 310 and a transceiver unit 320.

In a possible design, the beam training apparatus 300 may correspond to the STA in the foregoing method embodiment. For example, the beam training apparatus 300 may be the STA, or may be a chip disposed in the STA.

Specifically, the beam training apparatus 300 may correspond to the STA in the method 200 in the embodiments of this application, and the apparatus 300 may include units configured to perform the method performed by the STA device in the method shown in FIG. 2A and FIG. 2B. In addition, the units in the apparatus 300 and the foregoing other operations and/or functions are separately intended to implement the corresponding procedures of the method 200 in FIG. 2A and FIG. 2B.

When the apparatus 300 is configured to perform the method 200 in FIG. 2A and FIG. 2B, the transceiver unit 320 may be configured to perform a receiving action of the STA in the method 200, and the processing unit 310 may be configured to perform determining and processing actions of the STA in the method 200.

It should be understood that an example process in which the units perform the foregoing corresponding steps is described in detail in the foregoing method embodiment. For brevity, details are not described herein again.

Figure 8:
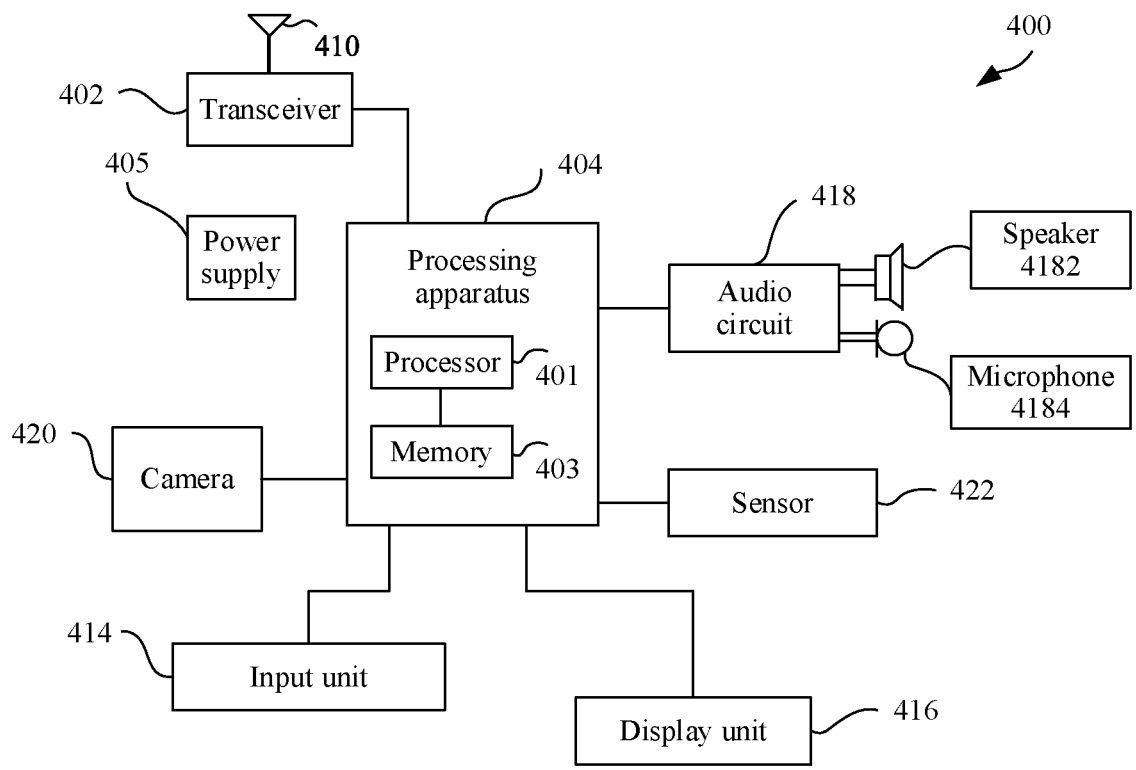
FIG. 8 is a schematic diagram of an example of a STA according to this application.

It should be understood that, in the apparatus 300, the processing unit 310 may correspond to a processor 401 in a STA shown in FIG. 8, and the transceiver unit 320 may correspond to a transceiver 402 in STA shown in FIG. 8.

In another possible design, the apparatus 300 may correspond to the AP in the foregoing method embodiment. For example, the apparatus 300 may be the AP, or may be a chip disposed in the AP.

Specifically, the beam training apparatus 300 may correspond to the AP in the method 200 in the embodiments of this application, and the apparatus 300 may include units configured to perform the method performed by the AP in the method shown in FIG. 2A and FIG. 2B. In addition, the units in the apparatus 300 and the foregoing other operations and/or functions are separately intended to implement the corresponding procedures of the method 200 in FIG. 2A and FIG. 2B.

When the apparatus 300 is configured to perform the method 200 in FIG. 2A and FIG. 2B, the transceiver unit 320 may be configured to perform a receiving action of the AP in the method 200, and the processing unit 310 may be configured to perform determining and processing actions of the AP in the method 200.

It should be understood that an example process in which the units perform the foregoing corresponding steps is described in detail in the foregoing method embodiment. For brevity, details are not described herein again.

Figure 9:
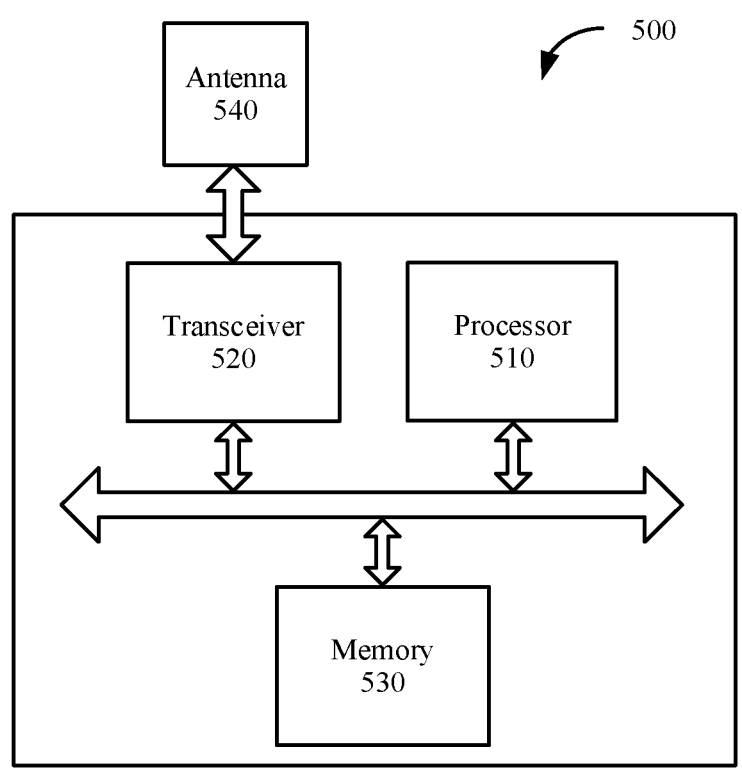
FIG. 9 is a schematic diagram of an example of an AP according to this application.

It should be understood that, in the apparatus 300, the processing unit 310 may correspond to a processor 510 in an AP shown in FIG. 9, and the transceiver unit 320 may correspond to a transceiver 520 in the AP shown in FIG. 9.

FIG. 8 is a schematic structural diagram of a STA 400 according to an embodiment of this application. As shown in the figure, the STA 400 includes a processor 401 and a transceiver 402. Optionally, the STA 400 further includes a memory 403. The processor 401, the transceiver 402, and the memory 403 may communicate with each other through an internal connection path, to transfer a control signal and/or a data signal. The memory 403 is configured to store a computer program. The processor 401 is configured to invoke the computer program from the memory 403 and run the computer program, to control the transceiver 402 to send or receive a signal. Optionally, the STA 400 may further include an antenna 410, configured to send, by using a radio signal, uplink data or uplink control signaling that is output by the transceiver 402.

The processor 401 and the memory 403 may be integrated into one processing apparatus. The processor 401 is configured to execute program code stored in the memory 403, to implement the foregoing functions. In an example implementation, the memory 403 may alternatively be integrated into the processor 401, or may be independent of the processor 401.

When program instructions stored in the memory 403 are executed by the processor 401, the processor 401 can control the transceiver 402 to receive first information, where the first information is used to indicate N first moments in a first training window, N is an integer greater than or equal to 1, the N first moments are determined by M access points APs through negotiation, or the N first moments are determined by a controller of the M APs, and M is an integer greater than or equal to 2. In addition, the processor 401 can control the transceiver 402 to send, through a first beam, beam training information to the M APs at each of the N first moments. Then, the processor 401 can control the transceiver 402 to receive M pieces of measurement information for the first beam, where the M pieces of measurement information are in a one-to-one correspondence with the M APs, and each piece of measurement information is determined by a corresponding AP based on the received beam training information.

Specifically, the STA 400 may correspond to the STA (for example, the STA #1) in the method 200 according to the embodiments of this application, and the STA 400 may include units configured to perform the method performed by the STA (for example, the STA #1) in the method 200 in FIG. 2A and FIG. 2B. In addition, the units in the STA 400 and the foregoing other operations and/or functions are separately used to implement corresponding procedures of the method 200 in FIG. 2A and FIG. 2B. The processor 401 may be configured to perform an action that is implemented inside the STA and that is described in the foregoing method embodiment, and the transceiver 402 may be configured to perform an action of sending to the AP or receiving from the AP that is performed by the STA and that is described in the foregoing method embodiment. For details, refer to the descriptions in the foregoing method embodiment. Details are not described herein again.

Optionally, the terminal device 400 may further include a power supply 405, configured to supply power to various components or circuits in the terminal device.

In addition, to make functions of the terminal device more perfect, the terminal device 400 may further include one or more of an input unit 414, a display unit 416, an audio circuit 418, a camera 420, a sensor 422, and the like, and the audio circuit may further include a speaker 4182, a microphone 4184, and the like.

FIG. 9 is a schematic structural diagram of an AP 500 according to an embodiment of this application. As shown in the figure, the AP 500 includes a processor 510 and a transceiver 520. Optionally, the AP 500 further includes a memory 530. The processor 510, the transceiver 520, and the memory 530 communicate with each other through an internal connection path, to transfer a control signal and/or a data signal. The memory 530 is configured to store a computer program. The processor 510 is configured to invoke the computer program from the memory 530 and run the computer program, to control the transceiver 520 to send or receive a signal.

The processor 510 and the memory 530 may be integrated into one processing apparatus. The processor 510 is configured to execute program code stored in the memory 530, to implement the foregoing functions. In an example implementation, the memory 530 may alternatively be integrated into the processor 510, or may be independent of the processor 510.

The AP 500 may further include an antenna 540, configured to send, by using a radio signal, downlink data or downlink control signaling that is output by the transceiver 520.

When program instructions stored in the memory 530 are executed by the processor 510, the processor 510 is configured to determine N first moments in a first training window, where N is an integer greater than or equal to 1, the N first moments are determined by M access points APs through negotiation, or the N first moments are determined by a controller of the M APs, M is an integer greater than or equal to 2, S first moments in the N first moments are in a one-to-one correspondence with S beams used by the AP 500, and S is an integer greater than or equal to 1 and less than or equal to N. In addition, the processor 510 is configured to control the transceiver 520 to receive, at a target first moment through a beam corresponding to the first moment, beam training information sent by a station STA through a first beam, where the target first moment is any one of the S first moments. In addition, the processor 510 is configured to determine measurement information for the first beam based on the beam training information received through the S beams. In addition, the processor 510 is configured to control the transceiver 520 to send the measurement information for the first beam.

Specifically, the AP 500 may correspond to the AP (for example, the AP #m) in the method 200 in the embodiments of this application. The AP 500 may include units configured to perform the method performed by the AP (for example, the AP #m) in the method 200 in FIG. 2A and FIG. 2B.

In addition, when the AP serves as the device #A, the device #B, or the device #C, the AP 500 may include units configured to perform the method performed by the device #A, the device #B, or the device #C in the method 200 in FIG. 2A and FIG. 2B.

In addition, the units in the AP 500 and the foregoing other operations and/or functions are separately used to implement corresponding procedures of the method 200 in FIG. 2A and FIG. 2B. A example process of performing the foregoing corresponding steps by the units is described in detail in the method 200. For brevity, details are not described herein again.

The processor 510 may be configured to perform an action that is implemented inside the AP and that is described in the foregoing method embodiment, and the transceiver 520 may be configured to perform an action of sending to the terminal device or receiving from the terminal device that is performed by the AP and that is described in the foregoing method embodiment. For details, refer to the descriptions in the foregoing method embodiment. Details are not described herein again.

It should be understood that, the processor in the embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like.

It should be further understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative description, many forms of random access memories (RAM) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the method provided in the embodiments of this application, this application further provides a computer program product. The computer program product includes computer program code. When the computer program code is run on a computer, the computer is enabled to perform the method in the embodiment shown in FIG. 2A and FIG. 2B, FIG. 3, or FIG. 4.

According to the method provided in the embodiments of this application, this application further provides a computer-readable medium. The computer-readable medium stores program code. When the program code is run on a computer, the computer is enabled to perform the method in the embodiment shown in FIG. 2A and FIG. 2B, FIG. 3, or FIG. 4.

According to the method provided in the embodiments of this application, this application further provides a system. The system includes the foregoing one or more terminal devices and the foregoing one or more network devices.

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, the procedures or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the apparatus embodiment described above is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam training method, wherein the method comprises:
    generating and sending, by a first receiving device in M receiving devices, a set up frame, wherein the set up frame comprises M pieces of time information, each piece of time information corresponds to one receiving device in the M receiving devices, each piece of time information is used to indicate a feedback information sending moment of the corresponding receiving device, each piece of time information is further used to indicate an acknowledgment information receiving moment of the corresponding receiving device, and M is an integer greater than or equal to 1;
    receiving, by the first receiving device, a sector sweep (SSW) frame sent by a sending device;
    generating, by the first receiving device, feedback information based on the SSW frame;
    sending, by the first receiving device, the feedback information at a feedback information sending moment indicated by corresponding piece of time information; and
    receiving, by the first receiving device at an acknowledgment information receiving moment indicated by the corresponding piece of time information, acknowledgment information sent by the sending device for the feedback information.

2. The method according to claim 1, wherein the set up frame comprises a plurality of device information fields, each device information field carries one piece of time information, and each device information field comprises a device identifier of a receiving device corresponding to the carried time information.

3. The method according to claim 1, wherein the set up frame comprises a scan mode field, information carried in the scan mode field is used to indicate a mode in a plurality of SSW frame sending modes, the plurality of SSW frame sending modes comprise a first mode and a second mode, the SSW frame is sent by the sending device in the first mode, and the SSW frame is sent by the first receiving device in the second mode.

4. The method according to claim 1, wherein the set up frame comprises a feedback mode field, information carried in the feedback mode field is used to indicate a mode in a plurality of feedback information sending modes, the plurality of feedback information sending modes comprise a third mode and a fourth mode, feedback information generated by the receiving devices is sent by a same receiving device in the third mode, and feedback information generated by each receiving device is separately sent by the receiving device in the fourth mode.

5. The method according to claim 1, wherein the sending, by the first receiving device, the feedback information at a feedback information sending moment indicated by corresponding time information comprises:
    receiving, by the first receiving device at a feedback information sending moment indicated by time information corresponding to each of other receiving devices than the first receiving device in the M receiving devices, feedback information sent by each of the other receiving devices, and sending, after aggregation, the received feedback information of the receiving devices to the sending device through a feedback frame; or
    sending, by the first receiving device, the feedback information to an aggregation receiving device in the M receiving devices at the feedback information sending moment indicated by the corresponding time information, wherein the aggregation receiving device can send, after aggregation, the feedback information of the receiving devices to the sending device through a feedback frame.

6. The method according to claim 5, wherein the feedback frame comprises M feedback information fields, each feedback information field is used to carry one piece of feedback information, and each feedback information field comprises a device identifier of a generation device of the carried feedback information.

7. A beam training method, wherein the method comprises:
    receiving, by a sending device, a set up frame, wherein the set up frame comprises M pieces of time information, each piece of time information corresponds to one receiving device in M receiving devices, each piece of time information is used to indicate a feedback information sending moment of the corresponding receiving device, each piece of time information is further used to indicate an acknowledgment information receiving moment of the corresponding receiving device, and M is an integer greater than or equal to 1;
    sending, by the sending device, a sector sweep (SSW) frame to the receiving device;
    receiving, by the sending device at the feedback information sending moment, feedback information generated and sent by each receiving device based on the SSW frame; and
    sending, by the sending device, acknowledgment information for the feedback information to each receiving device at the acknowledgment information receiving moment.

8. The method according to claim 7, wherein the set up frame comprises a plurality of device information fields, each device information field carries one piece of time information, and each device information field comprises a device identifier of a receiving device corresponding to the carried time information.

9. The method according to claim 7, wherein the set up frame comprises a scan mode field, information carried in the scan mode field is used to indicate a mode in a plurality of SSW frame sending modes, the plurality of SSW frame sending modes comprise a first mode and a second mode, the SSW frame is sent by the sending device in the first mode, and the SSW frame is sent by the receiving device in the second mode.

10. The method according to claim 7, wherein the set up frame comprises a feedback mode field, information carried in the feedback mode field is used to indicate a mode in a plurality of feedback information sending modes, the plurality of feedback information sending modes comprise a third mode and a fourth mode, feedback information generated by all the receiving devices is sent by a same receiving device in the third mode, and feedback information generated by each receiving device is separately sent by the receiving device in the fourth mode.

11. The method according to claim 7, wherein the receiving, by the sending device at the feedback information sending moment, feedback information generated and sent by each receiving device based on the SSW frame comprises:
  receiving, by the sending device at the feedback information sending moment indicated by the time information corresponding to each receiving device, the feedback information sent by each receiving device; or
  receiving, by the sending device, a feedback frame from an aggregation receiving device at a feedback information sending moment corresponding to the aggregation receiving device, wherein the feedback frame comprises the feedback information of each receiving device.

12. The method according to claim 11, wherein the feedback frame comprises M feedback information fields, each feedback information field is used to carry one piece of feedback information, and each feedback information field comprises a device identifier of a generating device of the carried feedback information.

13. A first receiving device, comprising a processor and a transceiver coupled to the processor, wherein:
  the processor is configured to generate a set up frame, wherein the set up frame comprises M pieces of time information, each piece of time information corresponds to one receiving device in M receiving devices, each piece of time information is used to indicate a feedback information sending moment of the corresponding receiving device, each piece of time information is further used to indicate an acknowledgment information receiving moment of the corresponding receiving device, and M is an integer greater than or equal to 1;
  the transceiver is configured to send the set up frame;
  the transceiver is further configured to receive a sector sweep (SSW) frame sent by a sending device;
  the processor is further configured to generate feedback information based on the SSW frame;
  the transceiver is further configured to:
  send the feedback information at a feedback information sending moment indicated by corresponding piece of time information; and
  receive at an acknowledgment information receiving moment indicated by the corresponding piece of time information, acknowledgment information sent by the sending device for the feedback information.

14. The first receiving device according to claim 13, wherein the set up frame comprises a plurality of device information fields, each device information field carries one piece of time information, and each device information field comprises a device identifier of a receiving device corresponding to the carried piece of time information.

15. The first receiving device according to claim 13, wherein the set up frame comprises a scan mode field, information carried in the scan mode field is used to indicate a mode in a plurality of SSW frame sending modes, the plurality of SSW frame sending modes comprise a first mode and a second mode, the SSW frame is sent by the sending device in the first mode, and the SSW frame is sent by the receiving device in the second mode.

16. The first receiving device according to claim 13, wherein the set up frame comprises a feedback mode field, information carried in the feedback mode field is used to indicate a mode in a plurality of feedback information sending modes, the plurality of feedback information sending modes comprise a third mode and a fourth mode, feedback information generated by the receiving devices is sent by a same receiving device in the third mode, and feedback information generated by each receiving device is separately sent by the receiving device in the fourth mode.

17. The first receiving device according to claim 13, wherein transceiver is further configured to:
  receive, at a feedback information sending moment indicated by time information corresponding to each of other receiving devices than the first receiving device in the M receiving devices, feedback information sent by each of the other receiving devices, and sending, after aggregation, the received feedback information of the receiving devices to the sending device through a feedback frame; or
  send the feedback information to an aggregation receiving device in the M receiving devices at the feedback information sending moment indicated by the corresponding time information, wherein the aggregation receiving device can send, after aggregation, the feedback information of the receiving devices to the sending device through a feedback frame.

18. The first receiving device according to claim 17, wherein the feedback frame comprises M feedback information fields, each feedback information field is used to carry one piece of feedback information, and each feedback information field comprises a device identifier of a generating device of the carried feedback information.

* * * * *

UNITED STATES PATENT AND TRADEMARK OFFICE
CERTIFICATE OF CORRECTION

PATENT NO. : 11,277,181 B2
APPLICATION NO. : 17/313123
DATED : March 15, 2022
INVENTOR(S) : Xiao Han et al.

Page 1 of 1

It is certified that error appears in the above-identified patent and that said Letters Patent is hereby corrected as shown below:

In the Specification

In Column 12, Line 7, delete "element." and insert -- element). --.

In Column 24, Line 10, delete "element." and insert -- element). --.

In Column 35, Line 7, delete "element," and insert -- element), --.

In Column 35, Line 52, delete "SWW" and insert -- SSW --.

In Column 35, Line 57, delete "SWW" and insert -- SSW --.

In Column 35, Line 58, delete "SWW" and insert -- SSW --.

In Column 49, Line 28, delete "(TDD" and insert -- (TDD) --.

Signed and Sealed this
Ninth Day of August, 2022

Katherine Kelly Vidal
*Director of the United States Patent and Trademark Office*